United States Patent
Henriksen et al.

(10) Patent No.: US 9,507,590 B2
(45) Date of Patent: Nov. 29, 2016

(54) TRANSITIVE SOURCE CODE VIOLATION MATCHING AND ATTRIBUTION

(71) Applicant: Semmle Limited, Oxford (GB)

(72) Inventors: Anders Starcke Henriksen, Oxford (GB); Ricardo Pescuma Domenecci, Florianopolis (BR)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 14/565,314

(22) Filed: Dec. 9, 2014

(65) Prior Publication Data
US 2016/0162289 A1    Jun. 9, 2016

Related U.S. Application Data

(60) Provisional application No. 62/089,133, filed on Dec. 8, 2014.

(51) Int. Cl.
*G06F 9/44* (2006.01)
*G06F 11/36* (2006.01)
*G06F 9/45* (2006.01)

(52) U.S. Cl.
CPC . *G06F 8/71* (2013.01); *G06F 8/30* (2013.01); *G06F 8/433* (2013.01); *G06F 8/436* (2013.01); *G06F 8/73* (2013.01); *G06F 8/75* (2013.01); *G06F 11/3604* (2013.01); *G06F 11/3616* (2013.01); *G06F 11/3688* (2013.01)

(58) Field of Classification Search
None
See application file for complete search history.

(56) References Cited

U.S. PATENT DOCUMENTS

| | | |
|---|---|---|
| 5,860,011 A | 1/1999 | Kolawa et al. |
| 7,647,579 B2 | 1/2010 | Drissi et al. |
| 7,694,181 B2 | 4/2010 | Noller et al. |
| 7,996,373 B1 | 8/2011 | Zoppas et al. |
| 8,091,055 B2 | 1/2012 | Brelsford et al. |
| 8,214,798 B2 | 7/2012 | Bellucci et al. |
| 8,336,030 B1 | 12/2012 | Boissy |
| 8,356,278 B2 | 1/2013 | Drissi et al. |
| 8,359,495 B2 | 1/2013 | Candea et al. |
| 8,413,108 B2 | 4/2013 | Groves et al. |
| 8,473,893 B2 | 6/2013 | Poole et al. |

(Continued)

OTHER PUBLICATIONS

Spacco et al., "Tracking defect warnings across versions," Proceedings of the 2006 International Workshop on Mining Software Repositories, MSR '06, May 22, 2005, pp. 133-136, XP055212551.

(Continued)

*Primary Examiner* — Qamrun Nahar
(74) *Attorney, Agent, or Firm* — Fish & Richardson P.C.

(57) ABSTRACT

Methods, systems, and apparatus, including computer programs encoded on computer storage media, for matching and attributing code violations. One of the methods includes receiving a plurality of snapshots of a code base, including data representing a revision graph of the snapshots of the code base and data representing respective violations in each of the plurality of snapshots. A plurality of transitively matched violations in the code base are generated, wherein each transitively matched violation represents a respective sequence of matching violations from a first violation of a first snapshot to a second violation of a second snapshot, wherein each transitively matched violation identifies a respective first violation representing an initial occurrence of a coding defect in the code base and a respective second violation representing a last occurrence of the coding defect in the code base.

35 Claims, 17 Drawing Sheets

(56) References Cited

U.S. PATENT DOCUMENTS

| | | |
|---|---|---|
| 8,640,101 B2 | 1/2014 | Spurlin |
| 9,208,056 B1 | 12/2015 | Henriksen et al. |
| 2004/0139370 A1 | 7/2004 | Bailey et al. |
| 2006/0123389 A1 | 6/2006 | Kolawa et al. |
| 2013/0055205 A1 | 2/2013 | Sereni et al. |
| 2014/0149435 A1 | 5/2014 | Sisman et al. |
| 2014/0201573 A1* | 7/2014 | Huang .................. G06F 11/362 714/38.1 |
| 2014/0297592 A1 | 10/2014 | Ohtake et al. |
| 2015/0052108 A1 | 2/2015 | Volk et al. |
| 2015/0309790 A1 | 10/2015 | Henriksen et al. |
| 2015/0324195 A1 | 11/2015 | Henriksen et al. |

OTHER PUBLICATIONS

Extended European Search Report issued in European Application No. 15196029.1 on Mar. 9, 2016, 8 pages.

Corley et al., "Recovering traceability links between source code and fixed bugs via patch analysis," May 2001, 7 pages.

Palix et al., "Tracking Code Patterns Over Multiple Software Versions with Herodotos", 17. Proceedings of the Eighth International Conference on Aspect-Oriented Software Development, AOSD '10, Mar. 2010, pp. 169-180.

Sisman et al., "Incorporating version histories in information retrieval based bug localization," Jun. 2012, 10 pages.

Wang et al., "Version history, similar report, and structure: putting them together for improved bug localization," Jun. 2014, 11 pages.

* cited by examiner

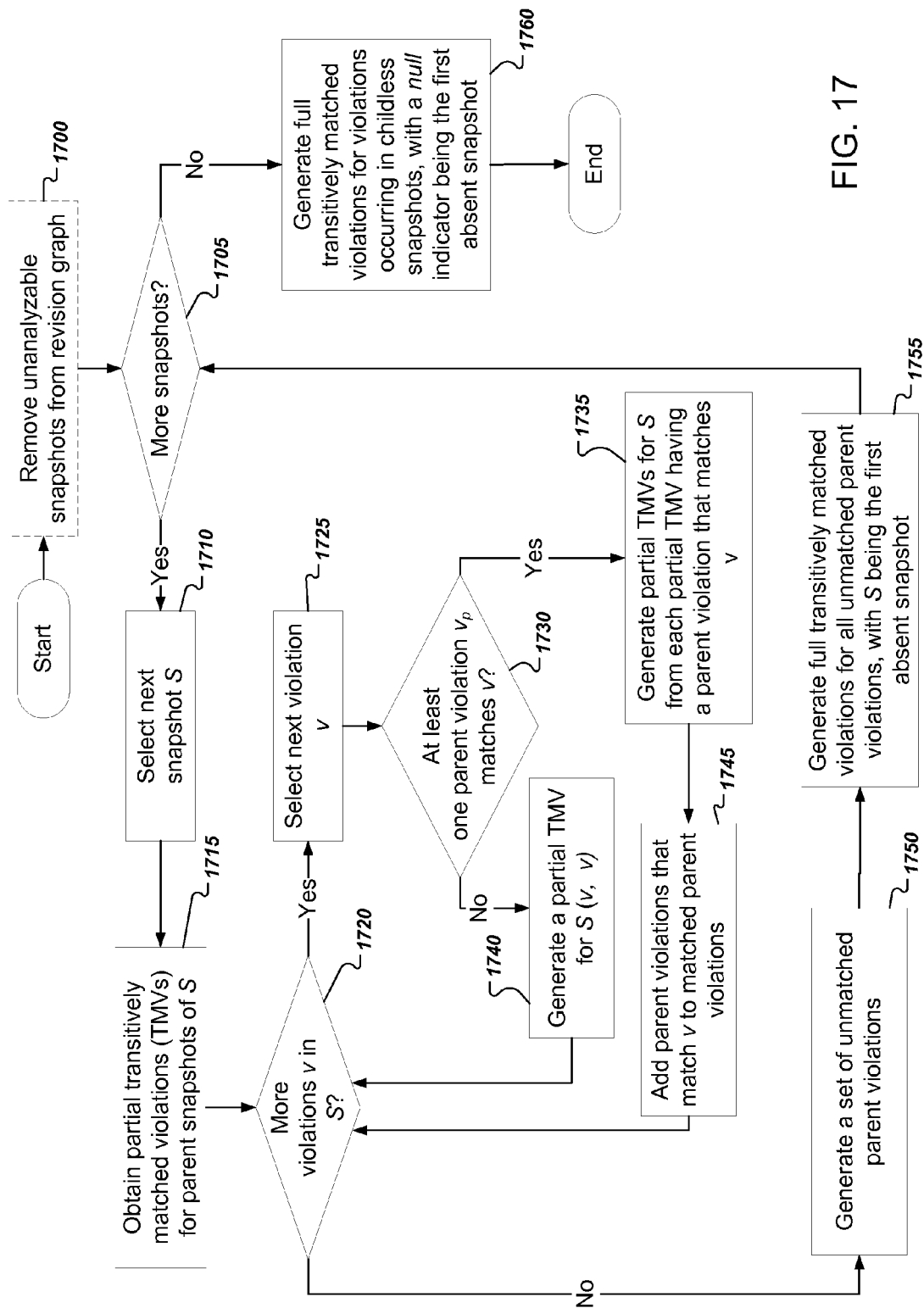

TRANSITIVE SOURCE CODE VIOLATION MATCHING AND ATTRIBUTION

CROSS-REFERENCE TO RELATED APPLICATIONS

This application claims the benefit under 35 U.S.C. §119(e) of the filing date of U.S. Provisional Patent Application No. 62/089,133, filed on Dec. 8, 2014, entitled "Transitive Source Code Violation Matching and Attribution," the entirety of which is herein incorporated by reference.

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as the files existed at a particular point in time.

Snapshots stored in a version control system can be represented as a directed, acyclic revision graph. Each node in the revision graph represents a commit of the source code. A commit represents a snapshot as well as other pertinent information about the snapshot such as the author of the snapshot, and data about ancestor commits of the node in the revision graph. A directed edge from a first node to a second node in the revision graph indicates that a commit represented by the first node is a commit preceding a commit represented by the second node, and that no intervening commits exist in the version control system.

SUMMARY

This specification describes how a static analysis system can find matching violations between a snapshot S of a source code base and a snapshot T of the source code base. The snapshots are not necessarily adjacent in the revision graph. The system can then use the matching violations to attribute, to individual revisions, individual developers, or teams of developers, violations introduced and removed between the snapshots S and T. From the violations introduced and removed, the system can generate developer fingerprints that are characteristic of the tendency of individual developers to introduce and remove violations of certain types. The system can also find transitively matched violations in the code base, which represent coding defects that persisted in the code base through a sequence of snapshots of a code base revision graph.

Particular embodiments of the subject matter described in this specification can be implemented so as to realize one or more of the following advantages. Violations being introduced and removed can be accurately attributed to developers. Violations can be matched between snapshots even when additional source code has been added and even when violations have been moved between source code files. Violations can also be attributed even for merge commits and in the presence of unanalyzable snapshots.

Violation attribution can be used to improve team performance by helping to analyze the progress of status of a project. Violation attribution can help guide the selection of developers for various training programs and team assignments. Violation attribution also gives general insight into the software engineering process. Violation attribution can guide code reviews by drawing attention to common violations introduced by team members. Team performance can further be improved by reducing the number of violations that are introduced and by increasing the number of violations that removed. The ability for developers to see precisely which violations they have introduced and removed can drive developer motivation and self-improvement.

Determining transitively matched violations provides insight into the lifecycle of a violation. For a given transitively matched violation, the transitively matched violation indicates a developer who introduced the coding defect and when, and a developer who fixed the coding defect and when, if it has been fixed. Transitively matched violations provide information about which developers introduced the most outstanding violations in the code base, the responsiveness of developers, violations that weren't fixed by a developer or fixed quickly enough, the average lifespan of a violation, and the types of violations that tend to get fixed quickly or slowly. Transitively matched violations provide information about which developers tend to fix other developers' violations, which can be used to target training and developer pairing. The history of violations as indicated by transitively matched violations can indicate which types of violations get fixed faster than others, which can be used to assign priorities to different types of violations. Transitively matched violations also provide more robust violation attribution in the presence of unanalyzable snapshots.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 17 is a flow chart of an example process for determining transitively matched violations.

Like reference numbers and designations in the various drawings indicate like elements.

DETAILED DESCRIPTION

Figure 1:
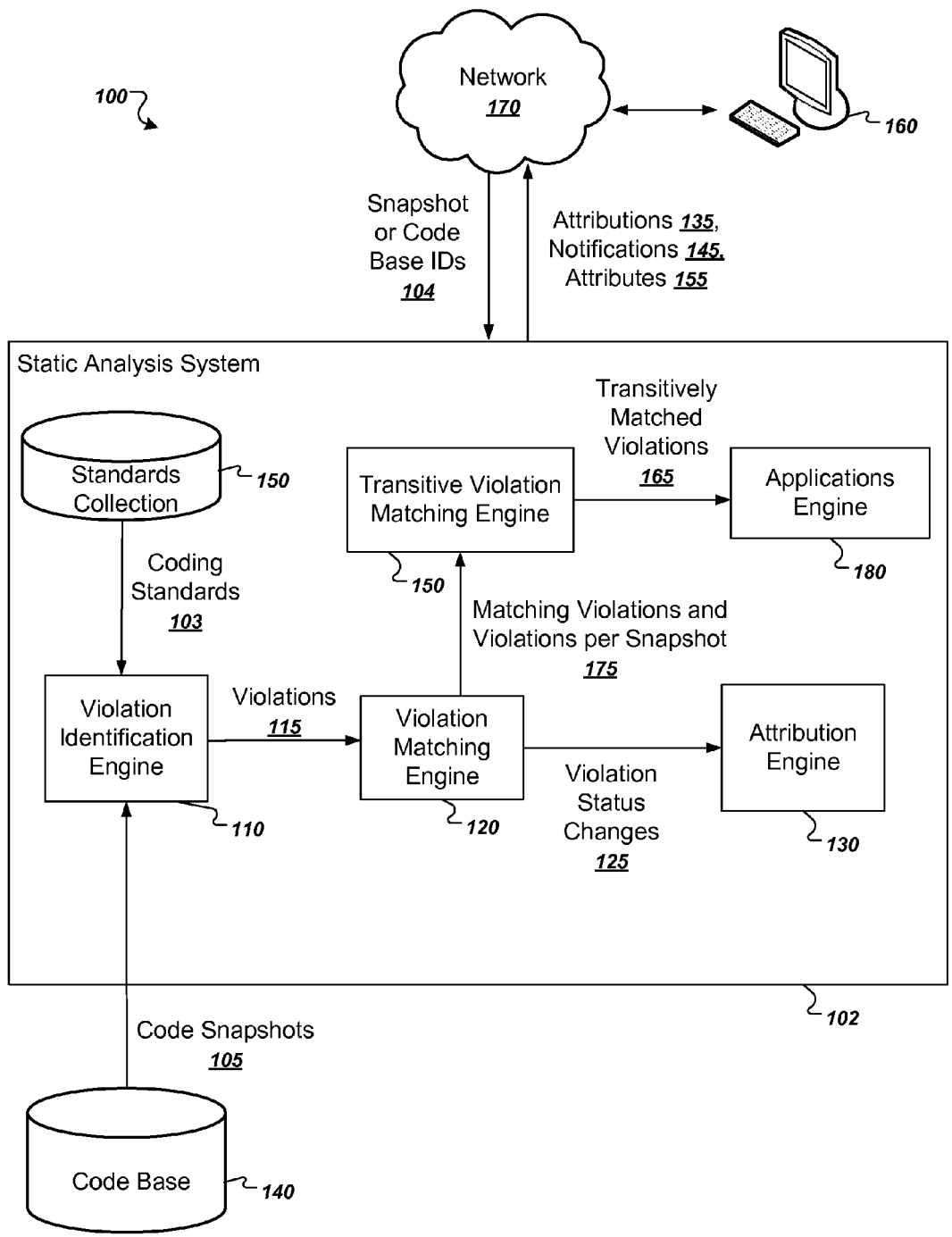
FIG. 1 illustrates an example system.

Static analysis can be performed on a code base, which may be referred to as a project. The project generally includes a collection of source code files organized in a particular way, e.g., arranged in a hierarchical directory structure, with each source code file in the project having a respective path.

Static analysis techniques include techniques for identifying violations of coding standards occurring in segments of source code. In the systems described below, violations will be represented by data elements that will also be referred to simply as violations when the meaning is clear from context.

A static analysis system can use any appropriate set of coding standards for identifying violations, e.g., the NASA Jet Propulsion Laboratory Institutional Coding Standard for the Java Programming Language, available at http://lars-lab.jpl.nasa.gov/JPL_Coding_Standard_Java.pdf. The types of violations that a static analysis system can identify include correctness standards on coding concurrent processes, maintainability standards on limiting duplicate code segments, readability standards on limiting code complexity, and framework standards on using code libraries, to name just a few examples.

In Table 1, below, is an example segment of source code that contains a violation. The line numbers refer to line numbers of an example source code file.

TABLE 1

```
127  Set<String> revs;
...
162  for (IRevision rev : new ArrayList<IRevision>(keep)) {
163    if (!revs.contains(rev)) {
...
179    }
180  }
```

On line 127, the variable "revs" is declared to be of type "Set<String>". In other words, "revs" is a set of data elements that are character strings. On line 162, the variable "rev" is declared to be of type "IRevision."

On line 163, the source code checks whether the IRevision element "rev" is contained in the string set "revs." This requires a comparison between data elements that are strings and data elements that are of type "IRevision." Thus, the check on line 163 violates a coding standard that comparisons must only performed between variables of the same type. In fact, the check on line 163 will likely always return "false," and thus must be corrected by a developer in order for the program to operate correctly.

A violation data element for a violation in a project can include data representing a snapshot, S, a location, l, and a violation type, t. The location l will delineate the source code that violates the applicable coding standard. The source code that violates the standard, or "violation snippet" will generally be a contiguous segment of source code; however, in some cases, it may be two or more disconnected segments of source code and the location l will specify all of the corresponding segments. Similarly, the source code will generally be found in one source code file, but may be found in two or more source code files.

The location l of a particular source code violation can be specified by a path of a source code file that includes the particular violation, as well as a start position and an end position of the violation snippet or, if the violation snippet includes multiple segments of source code, multiple start positions and end positions of the multiple segments within the file. Typically, the start and end positions within a file are represented by starting and ending line numbers within the file as well as an offset within the line, e.g., a column number or an offset that specifies a number of characters or bytes. For example, a violation data element representing the example violation illustrated above would have a violation snippet "revs.contains(rev)", and a location l that specifies a path of the example file, a beginning line 163 with beginning offset 10, and an ending line 163 with ending offset 28. The start and end positions can also be given by a byte offset within the file as a whole. Additionally, rather than an absolute end position, the end position could be specified as an offset from the start position of the violation.

A violation data element also has a type that indicates what sort of violation the violation is. For example, a violation representing the example violation illustrated above would have a type that indicates that the violation snippet violates a coding standard that forbids comparing data elements that have different types.

Two violations match each other if they refer to the same defect in their respective code bases. In other words, a violation $v_1$ in a first snapshot S matches a violation $v_2$ in a second snapshot T if $v_1$ refers to the same defect in the snapshot S as $v_2$ does in the snapshot T. A static analysis system can determine which violations in S match those in T. Given a set V of violations in S, and a set W of violations in T, a static analysis system can determine a set M of violations in V that have a matching violation in W, and a set N of violations in W that have a matching violation in V. The static analysis system can further require that no two elements of M match the same violation in W, and that no two elements of N match the same violation in V. The static analysis system can also determine a set P of violations that occur in V but do not match any violation in W, and a second set Q of violations that occur in W but do not match any violation in V.

A violation matching relationship may be symmetric, but need not be. In other words, a first violation $v_1$ may match a second violation $v_2$ even if the second violation $v_2$ does not match the first violation $v_1$.

A static analysis system can determine status changes of violations in one particular snapshot relative to another snapshot. In this specification, reference will be made to determining status changes of violations by comparison between a first snapshot S and a second snapshot T. The snapshot S may represent the source code files of the project at an earlier point in time than the snapshot T. The snapshot S and the snapshot T may also have a parent/child relationship in a revision graph. A first snapshot is a "parent" of a second snapshot when a commit of the first snapshot is a parent in the revision graph of a commit of the second snapshot. Similarly, a first snapshot is a "child" of a second snapshot when a commit of the first snapshot is a child in the revision graph of a commit of the second snapshot.

However, snapshots being compared need not have any particular relationship at all. In fact, the snapshot T may represent an earlier snapshot of the project than the snapshot S. The snapshot S and the snapshot T may be illustrated as adjacent in a revision graph; however, this is not required.

Status changes include the introduction of violations that were introduced in the snapshot T relative to the snapshot S as well as the removal of violations that were removed from the snapshot S relative to the snapshot T. Generally, violations that were introduced in the snapshot T relative to S are violations that occur in the snapshot T but do not occur in the snapshot S. Conversely, violations that were removed from the snapshot S relative to T are violations that occur in the snapshot S but do not occur in the snapshot T.

In a common situation where the snapshot S and the snapshot T are from the same code base, and the snapshot S is a sole parent of the snapshot T in a revision graph, the set M represents the set of violations in S that were uncorrected in the code base between the snapshots S and T; the set P represents the set of violations in S that were removed from the code base in snapshot T; and, the set Q represents the set of violations that were introduced into the code base in snapshot T.

In this specification, the term "matching violation" may be used to refer to a violation in a snapshot S, a violation in a snapshot T, or to a pair of corresponding violations in the snapshots S and T, which will be apparent from the context.

Because pairs of matching violations represent the same code defect, pairs of matching violations have the same type. However, matching violations may, but need not, have identical violation snippets. Similarly, matching violations may, but need not, occur at a same location within a file in the snapshot S and the snapshot T. Likewise, matching violations may, but need not, occur within a same file in the snapshot S and the snapshot T.

A static analysis system can attribute violation status changes to a responsible entity, e.g., to a particular snapshot or to a particular developer, by determining which violations match each other. In the case described above, when S is a sole parent of T, the removal of the violations in P and the introduction of the violations in Q could be attributed to snapshot T, or to the developer or team of developers responsible for snapshot T. There are also other circumstances in which a set of violations may be attributed to a snapshot or to a developer, which will be described in more detail below. A "developer" in this context may actually refer to a group or team of developers responsible for the snapshot T.

A static analysis system can also identify transitively matched violations in the code base. A transitively matched violation is a same coding defect occurring in each of a sequence of snapshots of the code base, where the sequence is defined by edges between nodes of the code base revision graph. For example, a coding defect that was introduced by a developer in snapshot S and was not removed until a few snapshots later in snapshot X is a transitively matched violation. Thus, a transitively matched violation can represent the lifecycle of a coding defect in the code base.

A system can identify a transitively matched violation by identifying a sequence of matching violations $v_1, v_2, \ldots, v_n$, with $v_1$ matching $v_2$, $v_2$ matching $v_3$, and so on through $v_{n-1}$ matching $v_n$, with each successive violation occurring in a successive snapshot of a sequence of snapshots in a code base revision graph.

A system can represent a transitively matched violation in a number of ways. In particular, the representation of intermediate violations in the sequence of matching violations can be explicit or implied. For example, a system may explicitly represent a transitively matched violation using all matching violations in the sequence of matching violations.

However, the intermediate violations need not be represented explicitly. For example, a system may represent a transitively matched violation by a tuple $(v_1, v_2, S)$, with $v_1$ and $v_2$ identifying respective violations that represent the first and last occurrences of the coding defect respectively, and with S representing the first snapshot subsequent to the snapshot of $v_2$ in the revision graph not having a coding defect that $v_2$ matches. In other words, S represents the first snapshot after the snapshot of $v_2$ in which the coding defect became absent. If the coding defect never became absent in the code base, the system can use a special reserved value, e.g., "null," to indicate that the coding defect never became absent. For example, if $v_2$ occurred in a snapshot having no children, which may be the most recently committed snapshot of the code base, the coding defect represented by $v_2$ would never have become absent.

Any pair of matching violations can be treated as a single, transitively matched violation represented by each of the matching violations. Furthermore, a single violation can also be represented the same way as a transitively matched violation when $v_1$ and $v_2$ refer to the same violation.

In the systems described below, a transitively matched violation will refer to a data element that includes information about two or more violations representing respective occurrences of a same coding defect in the coding base over a sequence of multiple snapshots.

FIG. 1 illustrates an example system 100. The system 100 includes a user device 160 in communication with a static analysis system 102 over a network 170. The static analysis system 102 includes several functional components, including a violation identification engine 110, a violation matching engine 120, a violation attribution engine 130, a transitive violation matching engine 150, and an applications engine 180. The components of the static analysis system 102 can be implemented as computer programs installed on one or more computers in one or more locations that are coupled to each through a network.

A user of user device 160 can initiate static analysis of snapshots of the code base 140. The user device 160 can communicate with the static analysis system 102 over the network 170, which can be any appropriate data communications network, e.g., one that includes an intranet or the Internet. For example, a user of user device 160 can specify snapshot or code base identifiers 104 of two or more snapshots or an entire code base for analysis. Alternatively, the static analysis system 102 can be installed in whole or in part on the user device 160.

The user of user device 160 can also communicate with the static analysis system 102 in order to specify or customize the coding standards that define coding violations in a standards collection 150.

Upon the user of user device 160 specifying the snapshots 104 for static analysis, the violation identification engine 110 receives the selected snapshots 105 from the code base 140, e.g., a parent snapshot and a child snapshot.

The violation identification engine can then retrieve coding standards 103 from the standards collection 150 to identify violations 115 that occur in the snapshot S and the snapshot T. Alternatively, the violations 115 can be obtained from other sources.

The violation matching engine 120 receives data representing the violations 115 from the violation identification engine 110. The violation matching engine 120 determines which of the violations 115 are matching violations between the snapshot S and the snapshot T. In other words, the violating matching engine 120 determines pairs of the violations 115 that match between the snapshots.

The violation matching engine 120 then determines violation status changes 125, which relate to violations 115 that are not matching violations. In particular, the violation status changes 125 will generally include the introduction of violations into the snapshot T and the removal of violations from the snapshot S.

The attribution engine 130 receives the violations status changes 125 from the violation matching engine 120 and attributes the violation status changes to a particular developer or to a particular snapshot. At this point, the static analysis system 102 can provide the attributions 135 of the violation status changes back to the user device 160, e.g., over the network 170.

The violation matching engine 120 can also provide the matching violations and a set of violations for each snapshot 175 to the transitive violation matching engine 150.

The transitive violation matching engine 150 receives the matching violations and violations per snapshot 175 and determines transitively matched violations 165. The transitively matched violations 165 represent coding defects that existed in the code base for one or more snapshots and which may still exist in the code base in a snapshot having no children, e.g., the most recently committed snapshot of the code base. The transitively matched violations 165 generally include information about violations that represent the snapshot in which the coding defect first occurred and last occurred.

The applications engine 180 receives the transitively matched violations 165. The applications engine 180 can then compute a variety of code base attributes 155 using the transitively matched violations 165. For example, the applications engine 180 can compute individual statistics for each violation, e.g., how long the violation existed in the code base 140, and aggregated statistics, e.g., an average length of time that a violation of a certain type exists in the code base 140. The applications engine 180 can also compute developer-specific or team-specific statistics, e.g., which developers or teams introduced which violations currently outstanding in a code base, or how much time passed before developers or teams fixed coding defects, which statistics can be used to rank or rate developers or teams.

In some implementations, the user of the system 102 can specify which particular code base attributes 155 should be computed by the applications engine 180. The applications engine 180 then computes the specified code base attributes 155 from the transitively matched violations 165 and provides the code base attributes 155 back to the user device 160 over the network 170.

Figure 2A:
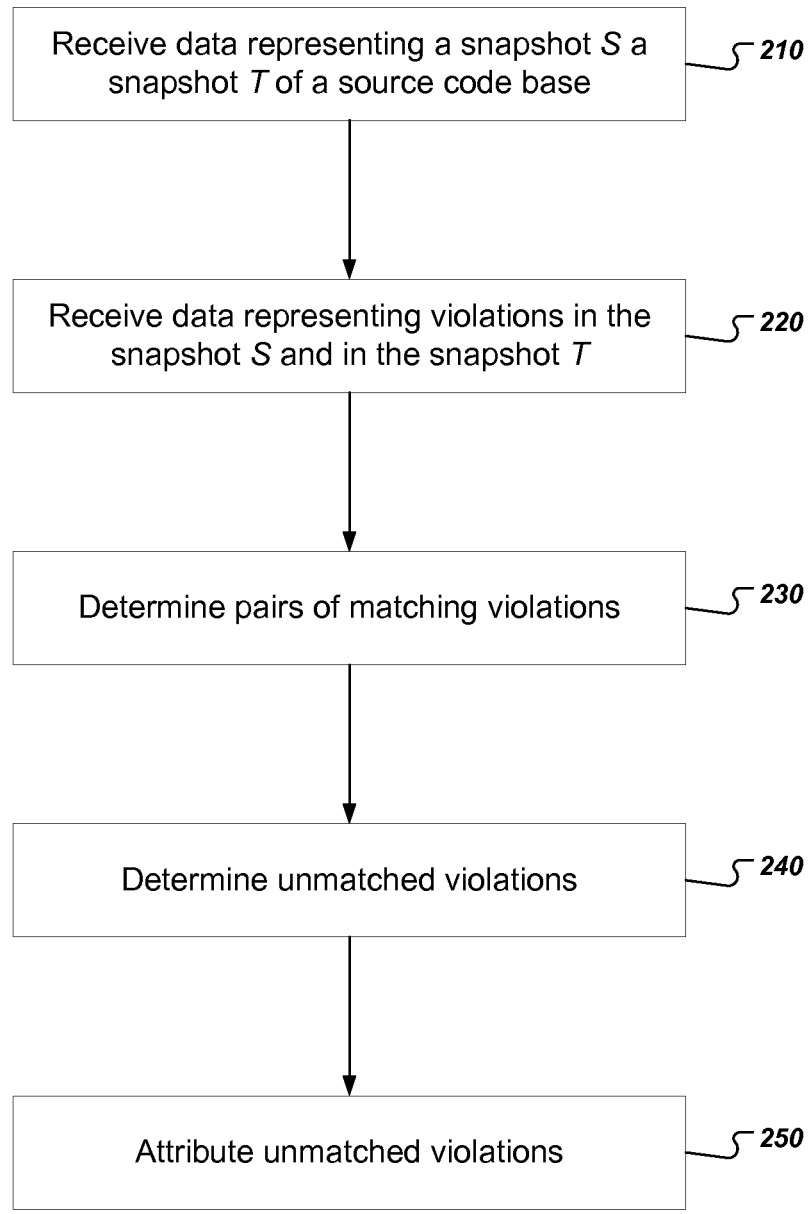
FIG. 2A is a flow chart of an example process for attributing violation status changes.

FIG. 2A is a flow chart of an example process for attributing violation status changes. The process can be implemented by one or more computer programs installed on one or more computers. The process will be described as being performed by an appropriately programmed system of one or more computers, e.g., the static analysis system 102 of FIG. 1.

In general, a static analysis system receives data identifying violations in a snapshot S and a snapshot T of a project. The system then determines matching violations and uses the matching violations to attribute violation status changes.

The system receives data representing a snapshot S and a snapshot T of a code base (210). The data includes data representing paths of source code files in each snapshot. The data may, but need not, include all of the actual source code of each snapshot.

The data representing the snapshots can include data about which files of the snapshot S correspond to files of the snapshot T. For example, if some files from the snapshot S were moved to a new directory or simply renamed in the snapshot T, the data can include cross-reference data representing a correspondence of paths for files in the snapshot S and files in the snapshot T. Two files having corresponding paths can be referred to as files having "matching paths." In some implementations, the system by default considers files to correspond if they have a same path in the snapshot S and in the snapshot T.

The system receives data representing violations in the snapshot S and in the snapshot T (220). The data representing the violations includes, for each violation, data representing a snapshot, a location, and a type. The data also includes the source code that corresponds to the violation.

In some implementations, the system determines the violations by analyzing source code from the snapshot S and the snapshot T. However, the system may also receive the data representing the violations from another source, e.g., as uploaded by a user, or as generated by a separate static code analyzer.

The system determines pairs of matching violations (230), i.e., categorizes particular pairs of violations as matching each other. In general, the system can compare each violation in the snapshot S with each violation in the snapshot T having the same type using one or more matching tests to determine whether the violations are matching violations. Once a pair of violations are determined to be matching violations, the system need not subject the violations to additional tests and can remove the violations from consideration. In addition, the system performs some matching tests only on violations that occur in corresponding files in each snapshot.

Figure 2B:
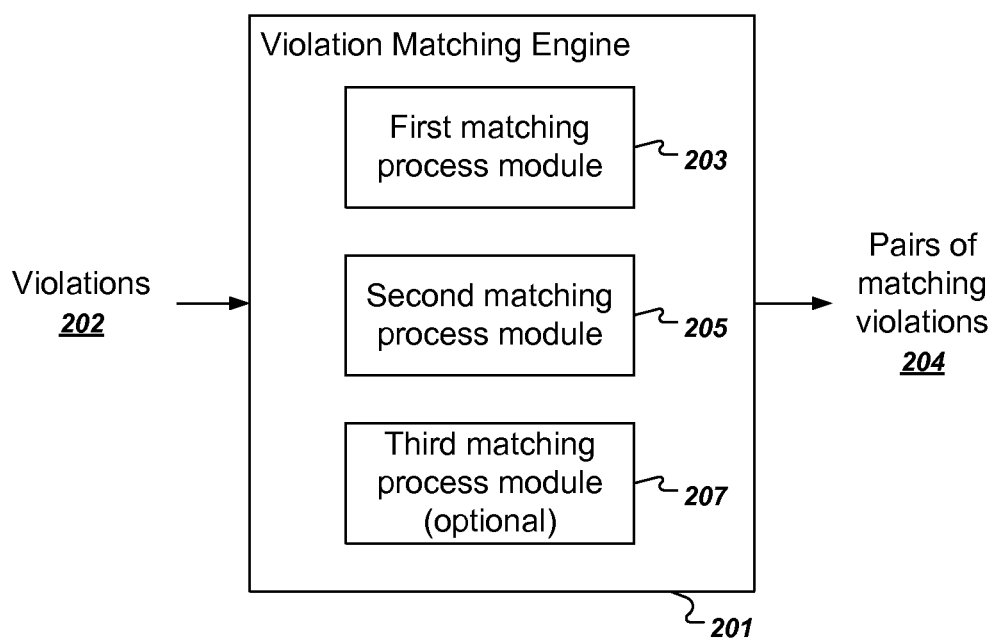
FIG. 2B is a block diagram of an example violation matching engine.

FIG. 2B is a block diagram of an example implementation 201 of a violation matching engine 120. This violation matching engine implementation 201 includes a first matching process module 203, a second matching process module 205, and an optional third matching process module 207. The violation matching engine implementation 201 receives violations 202 and generates pairs of matching violations 204. In some implementations, the violation matching engine 201 applies each violation matching process in sequence, with each subsequent process operating only on violations that have not yet been matched. The system can also perform the matching processes in different orders, or, alternatively, in parallel, in which case if any of the tests identifies two violations as matching violations, the two violations are included in the set of matching violations. Determining matching violations will be described in more detail below with reference to FIG. 4A.

The system determines unmatched violations (240), i.e., identifies violations that are not matching violations. The system determines both violations in the snapshot S that do not have a corresponding matching violation in the snapshot T as well as violations in the snapshot T that do not have a corresponding matching violation in the snapshot S. The unmatched violations are violations that correspond to a status change between the snapshot S and the snapshot T.

Figure 3:
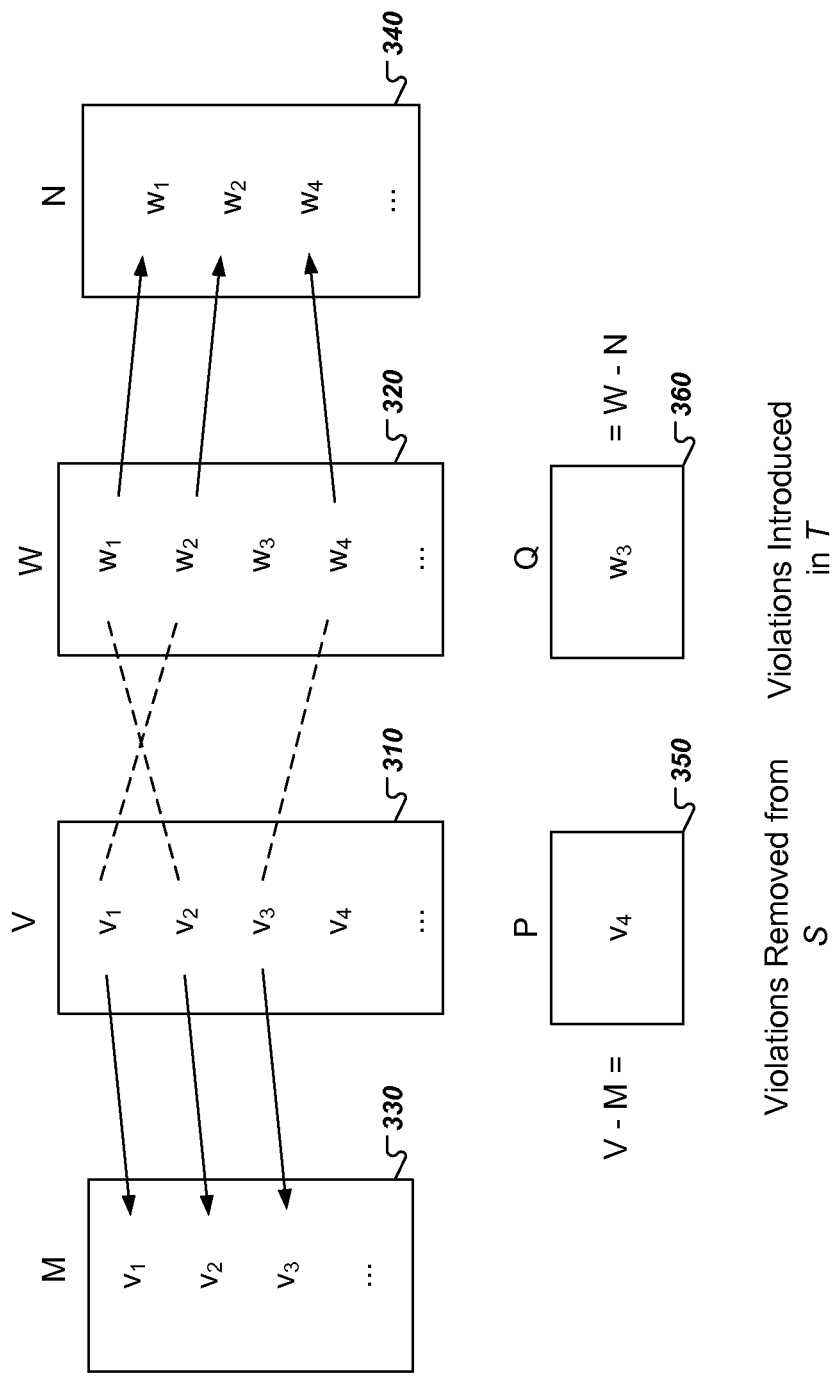
FIG. 3 illustrates determining unmatched violations.

FIG. 3 illustrates determining unmatched violations. In some implementations, the system maintains a set V 310 of violations in the snapshot S and a set W 320 of violations in the snapshot T. The system then determines matching violations. In FIG. 3, matching violations between V and W are indicated by the dashed lines.

When a violation in S matches a violation in T, the system adds the violation in S to a set M 330 of matched violations in S. Similarly, when a violation in T matches a violation in S, the system adds the violation in T to a set N 340 of matched violations in T.

The system can then determine a set 350 of unmatched violations in S by computing a set difference P=V−M between the set V 310 and the set M 330. Likewise, the system can determine a set 360 of unmatched violations in T by computing a set difference Q=W−N between the set W 320 and the set N 340.

In some implementations, the system removes matching violations from the set V 310 and from the set W 320 as the system finds the matching violations. Thus, after performing all the matching tests on all the violations, the altered set V 310 will be the set 350 of unmatched violations in S, and the altered set W 320 will be the set 360 of unmatched violations in T.

The system can also designate violations as matching violations in other ways. For example, the system can leave the set V 310 and the set W 320 the same but annotate each matching violation in S with a matching violation in T and vice versa.

As shown in FIG. 2A, the system attributes the unmatched violations to a revision or a developer or both (250). As described above, the unmatched violations in S may represent violations removed from the snapshot S, and the unmatched violations in T may represent violations introduced in the snapshot T.

The system can attribute a status change of an unmatched violation to a particular snapshot or to a particular developer or both. Typically, the system attributes status changes of violations to the snapshot T, or to the developer who was responsible for the snapshot Tin the version control system. There are exceptions, which will be discussed in more detail with reference to FIGS. 9-13.

Figure 4A:
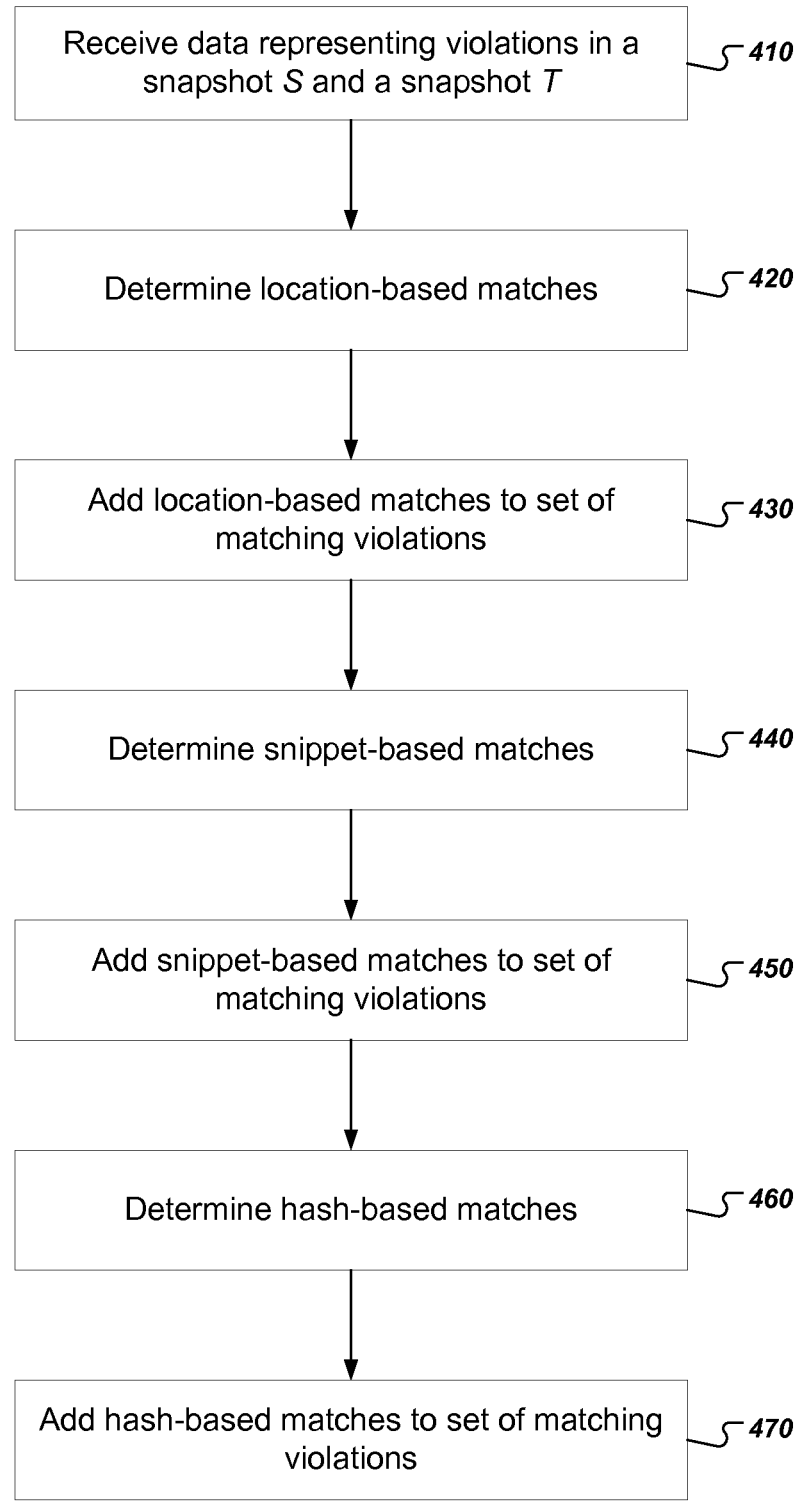
FIG. 4A is a flow chart of an example process for determining matching violations.

FIG. 4A is a flow chart of an example process for determining which violations match each other. The process can be implemented by one or more computer programs installed on one or more computers. The process will be described as being performed by an appropriately programmed system of one or more computers, e.g., the violation matching engine 120 of FIG. 1.

In general, a system receives data representing violations in a snapshot S and violations in a snapshot T. The system then performs a number of pair-wise matching tests between the violations.

In the process as illustrated, the system performs three matching tests in succession. The system performs location-based matching tests, snippet-based matching tests, and hash-based matching tests. Thus, the system can analyze all violations using a particular family of matching tests before analyzing violations with a different family of matching tests. Optionally, the system can perform only two matching tests, or the process can perform more than two matching tests. The system can also perform the matching tests in a different order than the one illustrated, or, alternatively, in parallel, in which case if any of the tests identifies two violations as matching violations, the two violations are included in the set of matching violations.

As violations are matched, the system adds the matching violations to sets of matching violations. Violations that are already designated as matching can be removed from further consideration by other matching tests. In addition, violations having different types need not be tested. In other words, the system can skip performing matching tests for violations having different types.

The system receives data representing violations in a snapshot S and violations in a snapshot T (410). As described above, each violation is represented at least by a type, and a location, which includes a path and starting and ending points of the violation delineating a segment of source code of the violation.

The system determines location-based matches (420). In general, two violations are a location-based match if they occur in corresponding files in each snapshot and occur at a same or a similar location within a pair of corresponding line ranges, as will now be described in more detail.

Figure 5:
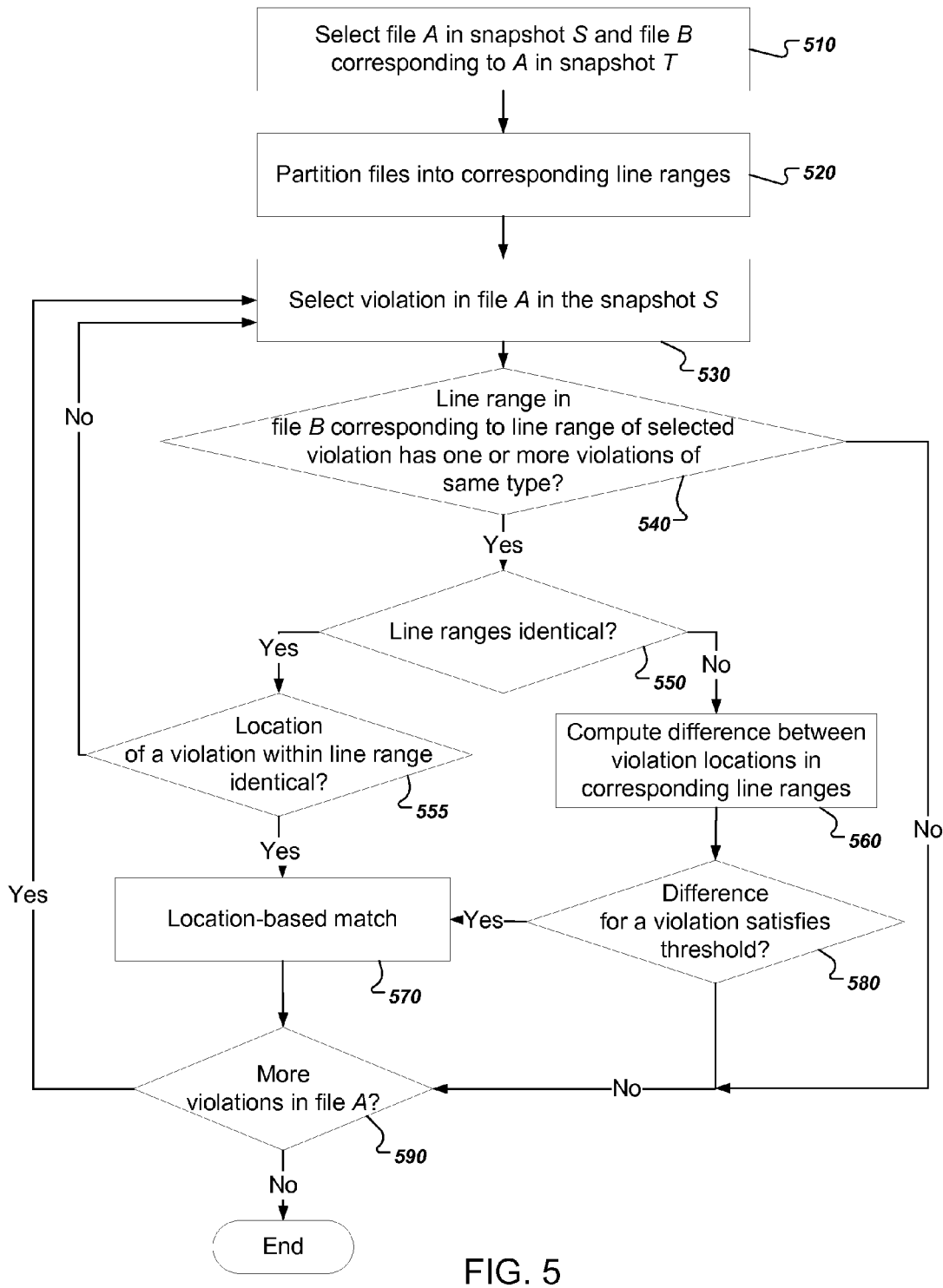
FIG. 5 is a flow chart of an example process for determining location-based matches.

FIG. 5 is a flow chart of an example process for determining location-based matches. The process will be described as being performed by an appropriately programmed system of one or more computers, e.g., the violation matching engine 120 of FIG. 1.

The system selects a file A in the snapshot S and a file B that corresponds to A in the snapshot T (510). In some implementations, to be a location-based match, two violations must occur in files that correspond to each other in the snapshots. Thus, to select pairs of violations to compare, the system can first select a pair of corresponding files from the snapshot S and the snapshot T. Thus, if a file in one snapshot does not have a corresponding file in the other snapshot, the system can skip the file. The system may also skip files if neither or only one of the corresponding files includes violations.

The system partitions the files into corresponding line ranges (520), i.e., line ranges that correspond with each other. In some implementations, the line ranges are non-overlapping.

The system can use any appropriate diffing algorithm to partition the files into corresponding line ranges. For example, the system can invoke a diffing method that performs the Myers diffing algorithm, which is described in more detail in Eugene W. Myers, *An O(ND) Difference Algorithm and Its Variations*, Algorithmica, 1 (2): 251-266, 1986, or one that performs the Hunt-Szymanski diffing algorithm, which is described in more detail in James W. Hunt and Thomas G. Szymanski, *A Fast Algorithm for Computing Longest Common Subsequences*, Communications of the ACM, 20(5), 1977.

In some implementations, the system dynamically chooses between the Myers diffing algorithm and the Hunt-Szymanski diffing algorithm. The system can compute a measure of identical lines between the files. If the measure satisfies a threshold, e.g., 90% identical, 95% identical, or 99% identical, the system chooses the Myers algorithm. Otherwise, the system chooses the Hunt-Szymanski algorithm.

Figure 6:
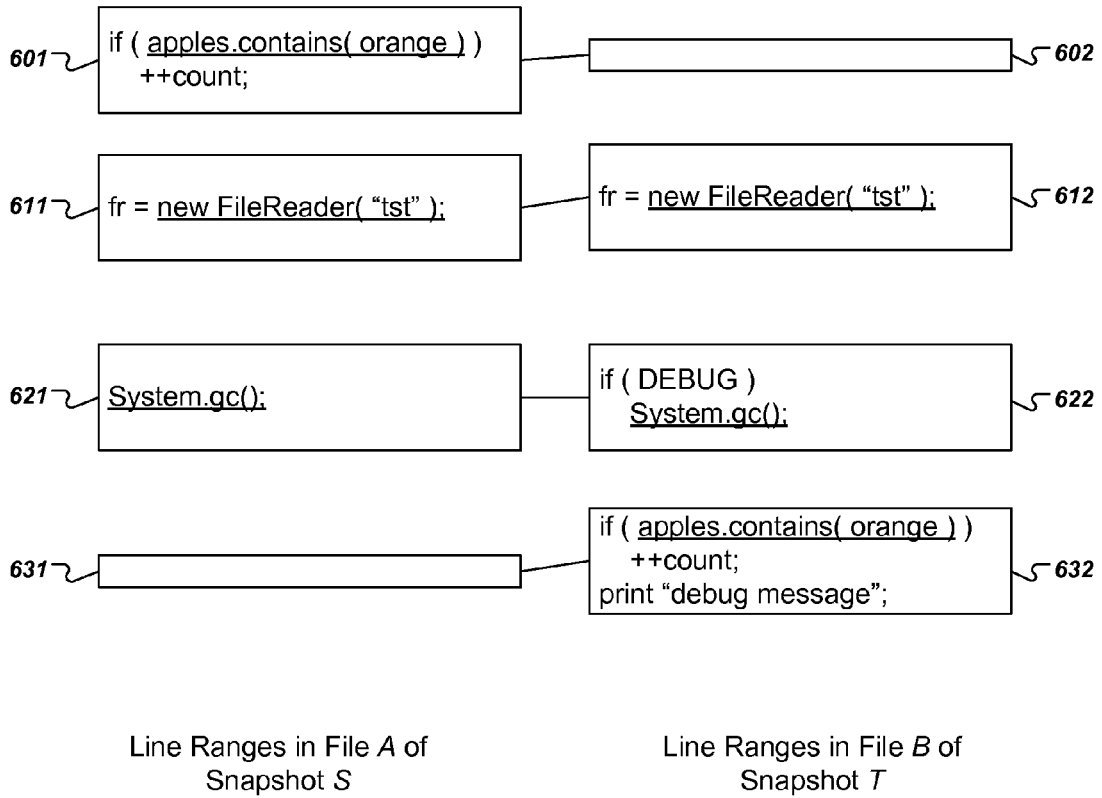
FIG. 6 illustrates files partitioned into corresponding line ranges.

FIG. 6 illustrates files partitioned into corresponding line ranges. The line ranges on the left are line ranges from the file in the snapshot S. The line ranges on the right are line ranges from the corresponding file in the snapshot T. In FIG. 6, the source code that is part of the violation, the violation snippets, are indicated by underlining. Although no line range in FIG. 6 contains more than one violation, this is not always the case. Some line ranges may contain multiple violations. In general, line ranges can contain zero or more violations.

The diffing algorithm outputs corresponding line ranges. The line range 601 corresponds to the line range 602, which is empty. The line range 611 corresponds to the line range 612. The line range 621 corresponds to the line range 622, and the line range 631 corresponds to the line range 632.

As shown in FIG. 5, the system selects a violation in file A in the snapshot S (530). The system can iterate over violations in the file A from the snapshot S, attempting to find matching violations in the file B from the snapshot T. The selected violation will have a particular line range in the file A as determined by the diffing algorithm.

The system determines whether a line range in file B corresponding to the line range of the selected violation has one or more violations of the same type (540). If the corresponding line range does not have one or more violations of the same type, the system can select a next violation from the file A (branch to 590).

In FIG. 6, for example, the line range 601 has a violation, indicated by underlining. However, the line range 601 corresponds to the line range 602, which does not have a violation. Thus, the system can skip location-based matching for the line range 601 and the line range 602.

On the other hand, if the corresponding line range does have one or more violations of the same type, the system determines whether the corresponding line ranges are identical (branch to 550). For example, in FIG. 6, the line range 611 has a violation and corresponds to the line range 612 that does have a violation of the same type. Thus, the system can determine whether the line range 611 and the line range 612 are identical.

In general, the system considers violations that occur in corresponding line ranges to be location-based matches if the respective locations of the violations within the corresponding line ranges differ by a threshold amount or less. The threshold amount can be specified in terms of a number of lines or a number of characters, for example.

In some implementations, the threshold amount changes depending on whether the source code delineated by the corresponding line ranges is identical or not. If the line ranges are identical, the system can use a smaller threshold, e.g., zero lines or zero characters, than a threshold used when the line ranges are not identical, e.g., greater than zero lines or characters. For example, the system can use threshold for line ranges that are not identical that is one, three, or ten lines of code.

The system determines whether the corresponding line ranges are identical (550). For example, in FIG. 6, the line range 611 and the line range 612 are identical.

If the line ranges are identical, the system determines whether the locations of a violation within the line ranges are identical (branch to 555). In other words, the system determines whether the locations of the violations differ by a threshold set to zero characters or zero lines. As described above, a violation data element has location data that delimits code of the violation, e.g., a starting line and an ending line. The system can use the location data within a line range for a violation to determine whether the location of the violations within their respective line ranges is identical, e.g., a same starting line and ending line within the line range. In some implementations, the system requires column or byte offset data of the locations to also be identical between the two violations. In other words, the locations of the violation snippets must be identical character-by-character, and not merely identical line-by-line.

If the corresponding line range in file B has multiple violations of the same type, the system determines whether any of the multiple violations have an identical location within the line range.

If the location of the violations within their respective line ranges is identical, the system determines that the violation from the file A and the violation having the identical location is a location-based match (branch to 570). For violations that match, the system typically removes them from further consideration or matching analysis. The system then determines whether there are more violations in the file A (590).

If the line ranges were not identical (550), the system computes the difference between the locations of the violations within the corresponding line ranges (branch to 560). For example, the system can compute the difference between a starting line number of a violation within a line range of the file A and respective starting line numbers of one or more violations within the corresponding line range of the file B.

For example, in FIG. 6, the violation in the line range 621 starts on line 1 of the line range 621. The violation in the corresponding line range 622 starts on line 2 of the line range 612. Thus, the difference between the violation locations in the corresponding line ranges is one line.

As shown in FIG. 5, the system determines whether the difference for a violation satisfies a threshold (580). If the difference satisfies a threshold, e.g., is within a line or is less than two lines, three lines, or five lines, the system designates the pair of violations as a location-based match (branch to 570).

If none of the respective differences for the violations from the corresponding line range of file B satisfy the threshold, the system does not designate the violations as a location-based match and determines whether there are more violations in the file A for comparison (branch to 590). If so, the system selects a next violation in the file A (branch to 530). If not, the process ends. The system can then repeat the process shown in FIG. 5 for all pairs of corresponding files between the snapshot S and the snapshot T.

As shown in FIG. 4A, the system adds the location-based matches to a set of matching violations (430). As described above, the system can move the matching violations into sets of matching violations or otherwise designate the violations as matching.

If all violations have been analyzed using location-based matching tests, the system determines whether there are any snippet-based matches (440). In general, two violations are a snippet-based match if they occur in corresponding files between the snapshots and if they have identical violation snippets.

Figure 7:
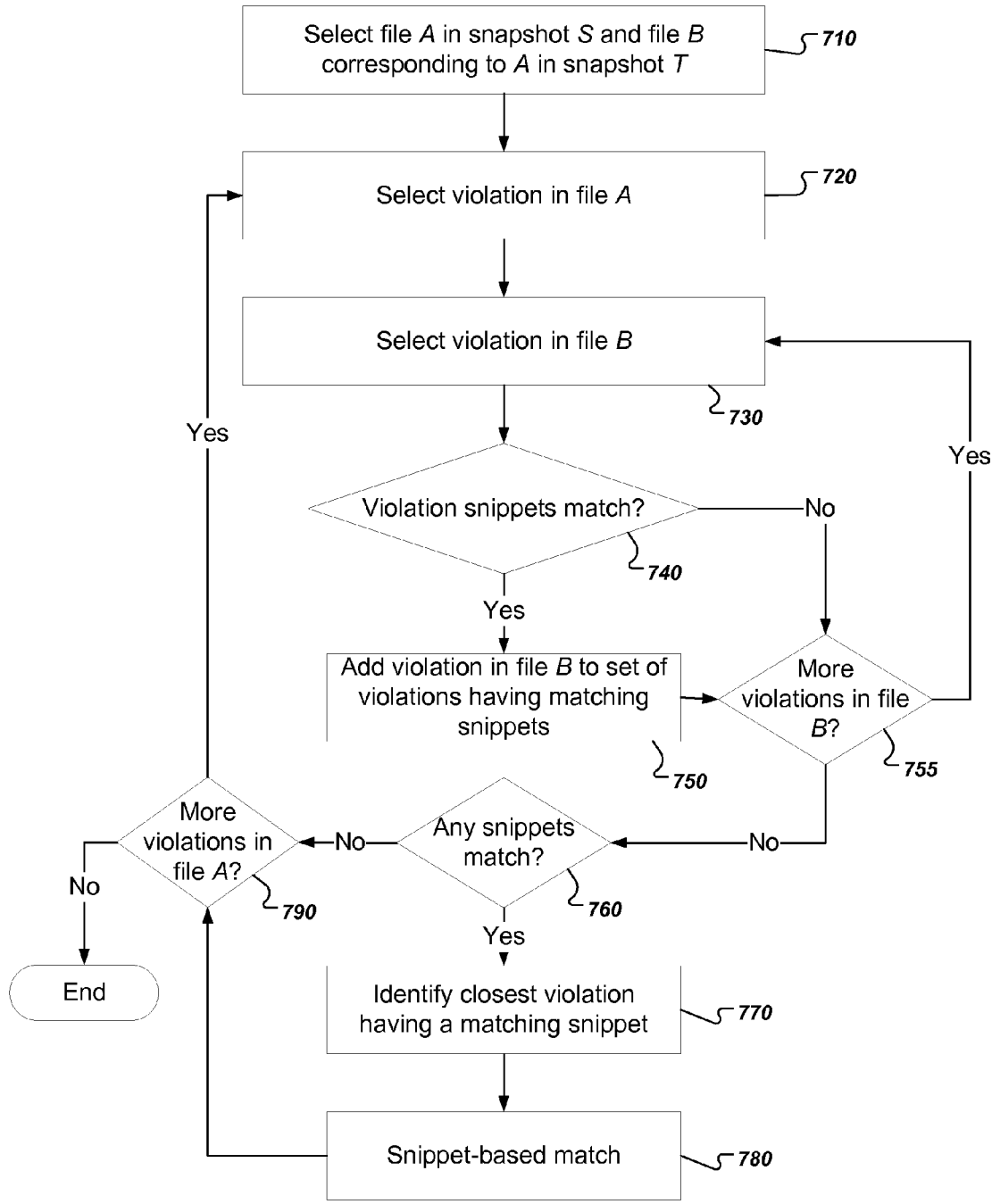
FIG. 7 is a flow chart of an example process for determining snippet-based matches.

FIG. 7 is a flow chart of an example process for determining snippet-based matches. The process will be described as being performed by an appropriately programmed system of one or more computers, e.g., the violation matching engine 120 of FIG. 1.

The system selects a file A in the snapshot S and a file B corresponding to A in the snapshot T having a matching path (710). Thus, if a file in the snapshot S or the snapshot T does not have a corresponding file with a matching path in the other snapshot, the system can skip the file. The system may also skip corresponding pairs of files if neither or only one of the files includes violations.

The system selects a violation in the file A (720). As described above with reference to FIG. 5, the system can iterate over violations in the file A, comparing each violation in the file A to each other violation in the file B.

Thus, the system selects a violation in the file B (730).

The system determines whether the violation snippets match (740). In other words, the system compares the source code delimited by the location l of each selected violation to determine whether the violations can be a snippet-based match.

Violation snippets match if the source code delimited by the respective location l of the violations is identical. If the location l designates multiple segments of source code, the system can require that each of the corresponding segments of source code to be identical in order for the violation snippets to match. The system may also concatenate the source code from multiple segments of the violation snippets into single strings and compare the strings to determine whether the violation snippets match.

In some implementations, the system does not require the violations snippets to be identical in order for violation snippets to match. The system can use fuzzy matching and approximate string matching techniques to find violation snippets that are similar but not identical. For example, the system can consider two violation snippets to be a fuzzy match if they are identical apart from white space and comments. The system can also consider violation snippets to be a fuzzy match if the violation snippets are calls to identical functions without considering argument names of the function calls. The system can also consider violation snippets to be a fuzzy match if the violations are both declarations of variables. The system can also consider the violations to be a fuzzy match if the violations both correspond to a same non-terminal or a same terminal in a formal representation of a source code programming language, e.g., a Backus-Naur representation.

The system can also use semantic-based matching techniques, for example, by comparing a location of the violations in an abstract syntax tree. In other words, if the violations have similar locations in the abstract syntax tree or if they correspond to identical subtrees in respective abstract syntax trees, or both, the system can consider the violation snippets to be a fuzzy match.

In terms of the example in FIG. 6, the violation snippet "apples.contains(orange)" is identical for both the line range 601 and the line range 632. Thus, the system can designate the violations as a snippet-based match, even though the violations occur in different locations in their respective files and even though the line range 601 is not identical to the line range 632.

As shown in FIG. 7, if the violation snippets match, the system adds the violation from the file B to set of violations having matching snippets so that the system can choose among potentially multiple violations having matching snippets (branch to 750). The system then determines whether there are more violations in the file B (755).

If the violation snippets did not match, the system determines whether there are more violations in the file B for comparison (branch to 755). If so, the system selects a next violation from the file B (branch to 730).

If the system has analyzed all violations in the file B, the system determines whether any violations having matching snippets were found (branch to 760). If not, the system does not determine any snippet-based matches for the selected violation and determines whether there are more violations from the file A (branch to 790).

If there were violations having matching snippets found, the system identifies a closest violation having an identical snippet (branch to 770). In other words, the system determines which violation, among the set of violations having identical snippets, has a location closest to the location of the selected violation from the file A. The system may skip this determination if only a single violation having a matching snippet was found.

The system then designates the closest violation having a matching snippet as a snippet-based match (780). The system can then repeat the process for all pairs of corresponding files between the snapshot S and the snapshot T.

As shown in FIG. 4A, the system adds the snippet-based matches to a set of matching violations (450) and removes them from the collection of violations. Once all unmatched violations have been analyzed using location-based matching tests, snippet-based matching tests, or both, the system determines hash-based matches (460).

Figure 8:
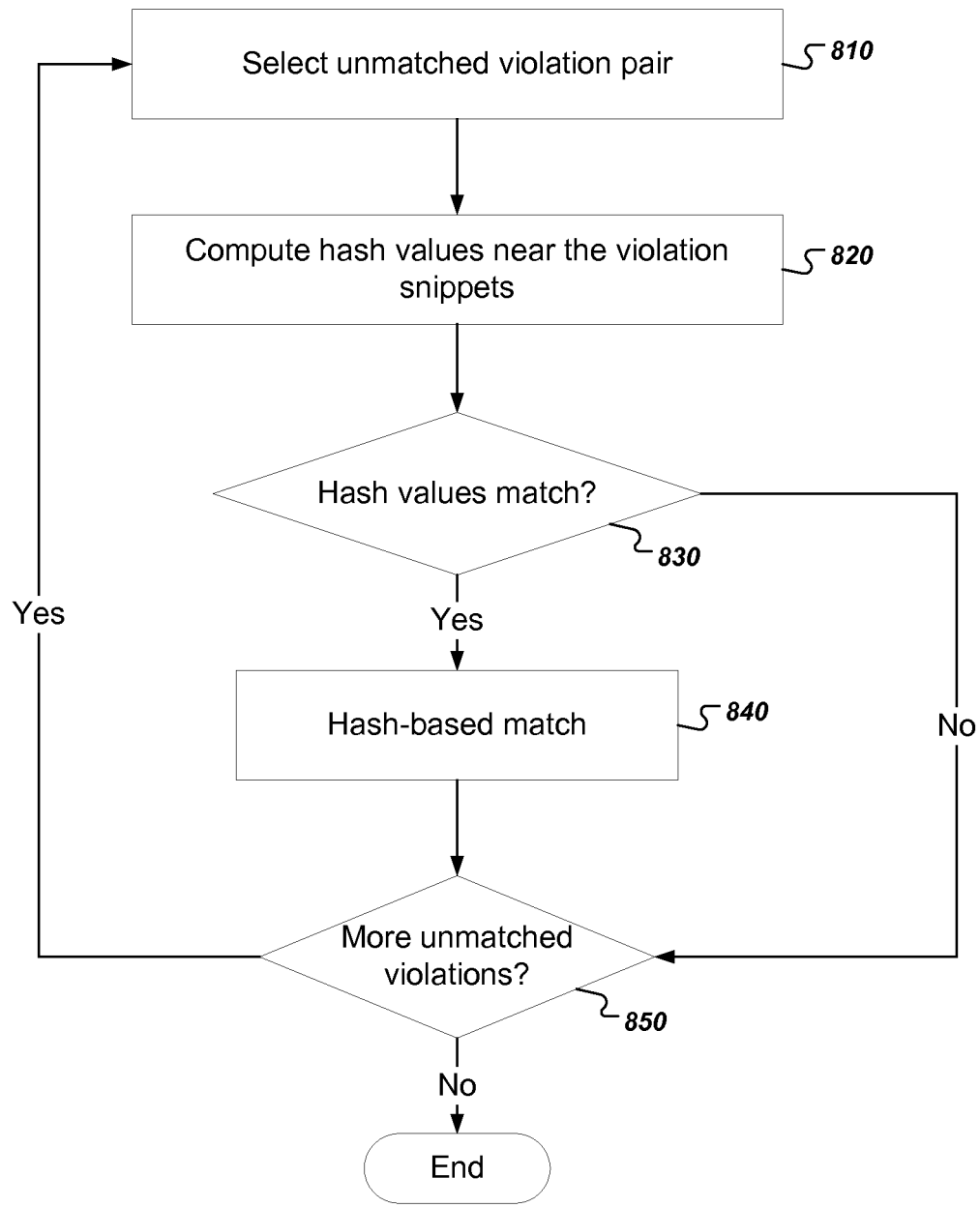
FIG. 8 is a flow chart of an example process for determining hash-based matches.

FIG. 8 is a flow chart of an example process for determining hash-based matches. Hash-based matching tests compute hash values from tokens in the source code file. A token in this context is a programming-language-dependent sequence of non-whitespace or non-comment characters of the source code file, e.g., variable names, keywords, string literals, and separators. In some implementations, only the types of some of the tokens are considered rather than their actual text. For example, a hash-matching process can match code even when variables have been renamed by hashing the string "variable name" wherever a variable name occurs rather than hashing a specific variable name. A hash value computed for a sequence of N tokens in a first file will match a hash value computed for a sequence of the same N tokens in a second file. Thus, violations need not occur in corresponding files or in files having a same path in order to be hash-based matches. In particular, hash-based matches can match violations that were moved from one file to another between the snapshot S and the snapshot T. The process will be described as being performed by an appropriately programmed system of one or more computers, e.g., the violation matching engine 120 of FIG. 1.

The system selects an unmatched violation pair (810). In general, because violations can be hash-based matches even if occurring in files having different paths or in files that do not correspond to one another, the system can compare each unmatched violation in the snapshot S to each unmatched violation in the snapshot T, or vice versa.

The system computes hash values for token sequences near the violation (820). For each violation of the selected pair, the system can compute multiple hash values using different token window sizes and positions.

For example, the system can compute a beginning hash value. The beginning hash value is a hash value computed using a token window that is generally positioned at the start of the violation snippet. For example, the token window can begin a particular number of tokens before the violation snippet and end with a first token of the violation snippet. Thus, the token window will generally include at least the beginning of the violation snippet. However, the system may also start the token window for the beginning hash value a number of tokens before or after the beginning of the violation snippet.

Similarly, the system can compute an ending hash value using a token window that is generally positioned at the end of the violation snippet. For example, the token window can begin with the last token of the violation snippet and end a particular number of tokens after the violation snippet. Thus, the token window will generally include at least the ending of the violation snippet. As with the beginning hash value, the system can start the token window for the ending hash value a number of tokens before or after the end of the violation snippet.

Likewise, the system can compute hash values using different token window sizes and positions relative to the respective violation. The system can also use token windows having different sizes depending on a type of the violation being matched. In some implementations, the system uses token windows having a fixed threshold size, e.g., 10 tokens, 75 tokens, or 200 tokens. The hash values can be computed using any convenient hashing algorithm.

In some implementations, the hash value is computed using a rolling hash function, e.g., the Rabin-Karp rolling hash, in which the hash value is computed using a fixed window of tokens in the sequence. For violations that occur near the beginning or the end of a source code file, the beginning hash value or the ending hash value may be undefined. The system can thus disregard undefined hash values. The system may also crop the token window accordingly to accommodate the beginning or the endings of a source code file. The system can also adjust the token windows at the beginning or end of the files to use the first or last token windows available for a particular token window size.

The system determines whether any of the hash values match (830). If any of the computed hash values matching between the snapshot S and the snapshot T, the system determines that the violations are a hash-based match (branch to 840).

Otherwise, the system determines whether there are more unmatched violations to be tested (branch to 850).

If there are more pairs of unmatched violations to be tested, the system selects a next pair of unmatched violations (branch to 810).

As shown in FIG. 4A, the system adds the hash-based matches to a set of matching violations (470) and removes them from the collection of violations.

After determining all pairs of matching violations, the system can determine unmatched violations and attribute the unmatched violations. As described above with reference to FIG. 2A, the system typically attributes status changes of violations to the snapshot T or to the developer responsible for the snapshot T.

Figure 4B:
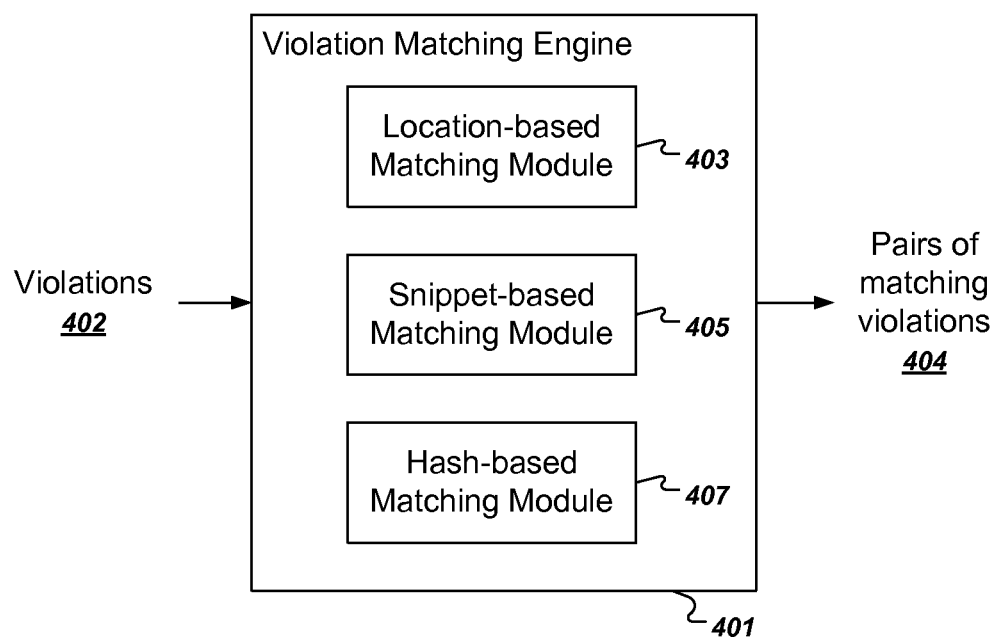
FIG. 4B is a block diagram of an example violation matching engine.

FIG. 4B is a block diagram of an example implementation 401 of a violation matching engine 120. This violation matching engine implementation 401 includes a location-based matching module 403, a snippet-based matching module 405, and a hash-based matching module 407. The violation matching engine implementation 401 receives violations 402 and generates pairs of matching violations 404. The modules each implement any one the location-based matching, snippet-based matching, or hash-based matching processes, respectively, described in this specification.

Figure 9:
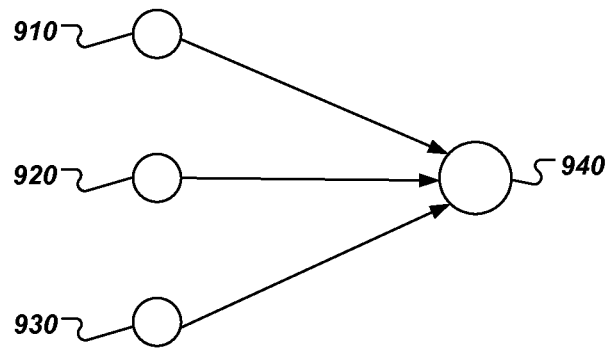
FIG. 9 is a diagram of a revision graph that shows a merge commit.

FIG. 9 is a diagram of a revision graph that shows a merge commit. A system can attribute violations in merge commit in a different way than for other, single-parent commits. A merge commit occurs when changes from multiple parent snapshots are merged into a child snapshot. In FIG. 9, the snapshot 940 has three parent snapshots, a first parent snapshot 910, a second parent snapshot 920, and a third parent snapshot 930.

Figure 10:
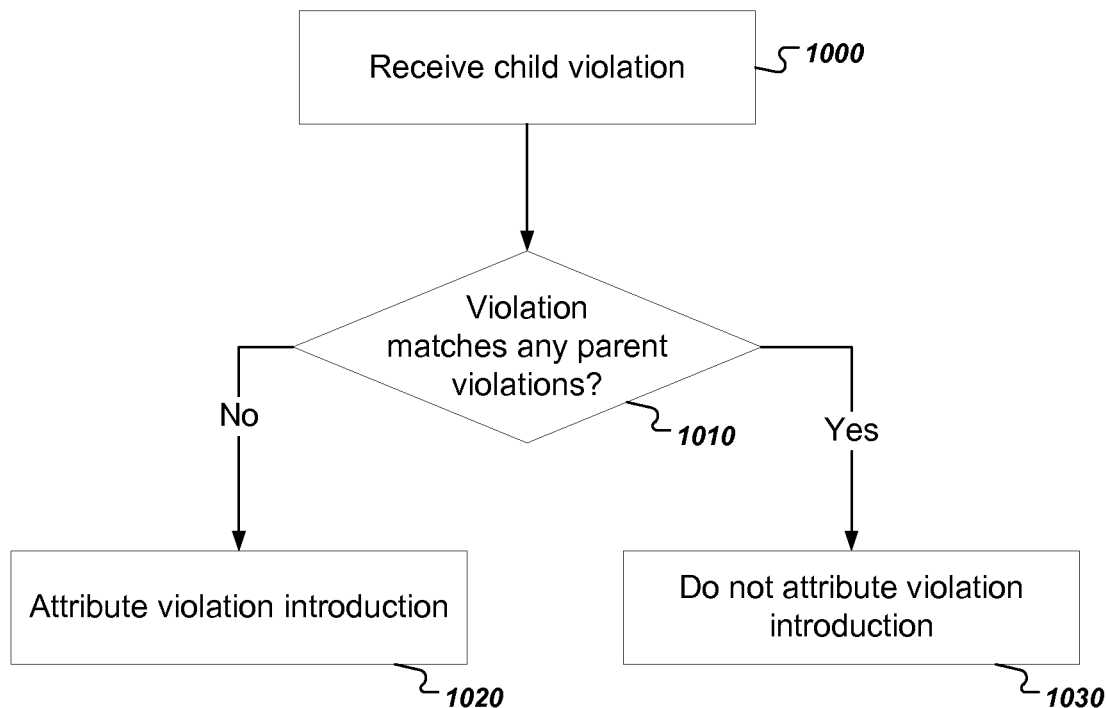
FIG. 10 is a flow chart of an example process for attributing introduced violations in a merge commit.

FIG. 10 is a flow chart of an example process for attributing introduced violations in a merge commit. The process will be described as being performed by an appropriately programmed system of one or more computers, e.g., the attribution engine 130 of FIG. 1.

The system receives a child violation (1000). A child violation represents a violation that is present in the child snapshot.

The system determines whether the violation matches any parent violation or violations of the multiple parent snapshots (1010). If the child violation does match a parent violation, the system does not attribute the violation introduction to the child snapshot or to a particular developer (branch to 1030).

On the other hand, if the child violation does not match any parent violations, the system can attribute the child violation introduction to the child snapshot or to a developer responsible for the child snapshot (branch to 1020).

Figure 11:
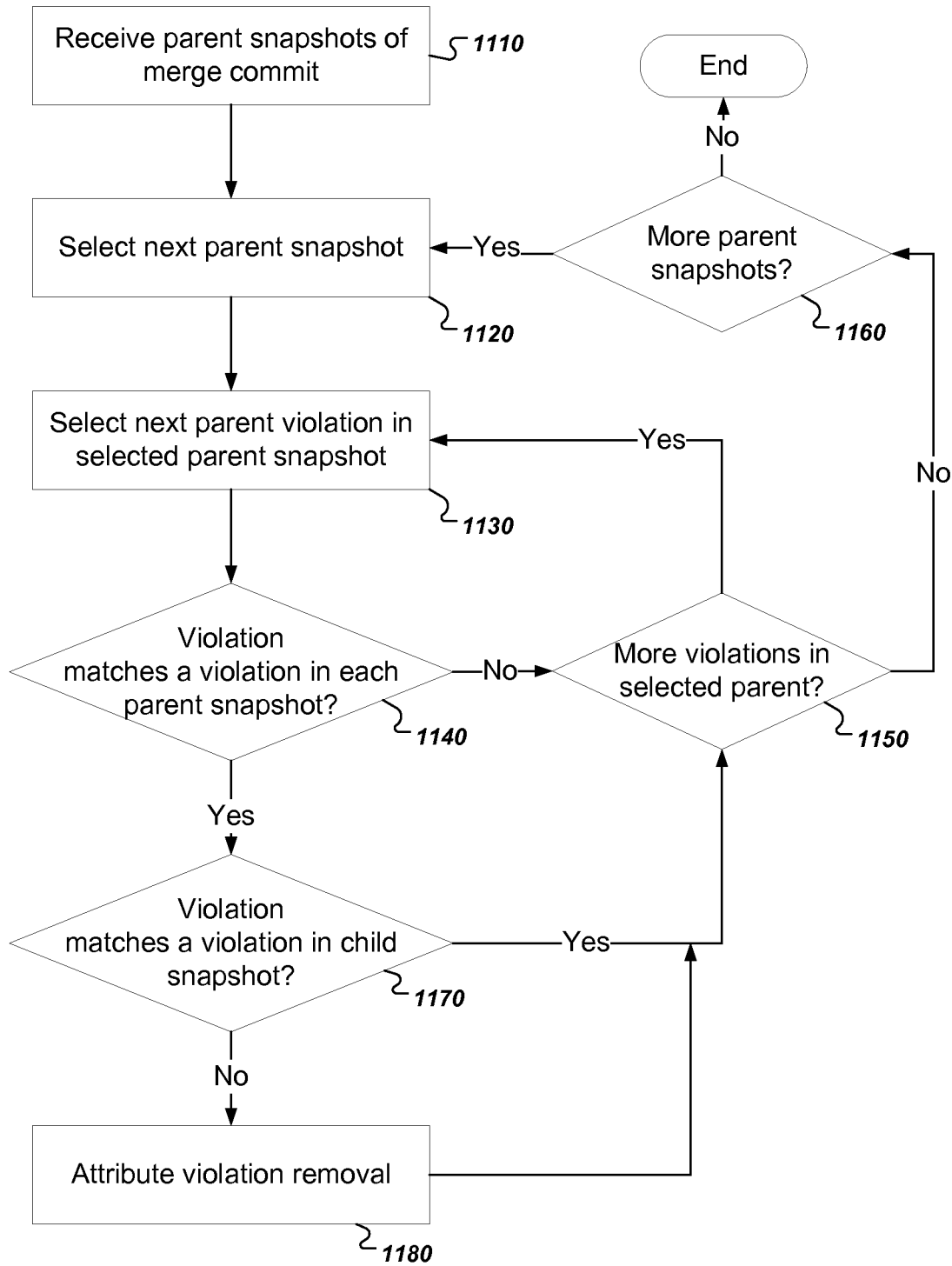
FIG. 11 is a flow chart of an example process for attributing removed violations in a merge commit.

FIG. 11 is a flow chart of an example process for attributing removed violations in a merge commit. The process will be described as being performed by an appropriately programmed system of one or more computers, e.g., the attribution engine 130 of FIG. 1.

The system receives parent snapshots of a merge commit (1110). In general, the system will iterate over each parent snapshot as a starting point to attempt to identify a violation that matches a violation in all parent snapshots. In general, violation matching may not be a transitive relationship. For example, a system may start with a first violation $v_1$ in a first parent snapshot. The first violation $v_1$ may match a second violation $v_2$ in a second parent snapshot, but may not match any violations in a third parent snapshot. The system can thus start the process again with $v_2$, as it is possible that $v_2$ will match violations in both the first and third parent snapshots, even though $v_1$ did not.

The system selects a next parent snapshot (1120). In general, the system will search each parent snapshot for violations that have a match in each other parent snapshot.

The system selects a next violation in the selected parent snapshot (1130). Within the selected parent snapshot, the system will iterate over violations to try to find violation match each other parent snapshot.

The system determines whether the selected parent violation has a matching violation in each other parent snapshot (1140). If the parent violation does not have a matching violation in each of the other parent snapshots, the system determines whether there are more violations within the selected parent snapshot (branch to 1150).

If so, the system selects a next parent violation in the selected parent snapshot (branch to 1130).

If not, the system determines whether there are more parent snapshots (branch to 1160). If there are more parent snapshots, the system selects a next parent snapshot (branch to 1120). If not, the process ends.

If the selected parent violation does have a matching violation in each of the other parent snapshots, the system determines whether the parent violation also matches a violation in the child snapshot (branch to 1170). If the parent violation also matches a violation in the child snapshot, the system does not attribute a status change for the violation and determines whether there are more violations in the selected parent snapshot (branch to 1150).

If the parent violation does not match a violation in the child snapshot, the system attributes a violation removal to the child snapshot or to the developer responsible for the child snapshot (branch to 1180). The system can then determine whether there are more violations in the selected parent snapshot (1150).

Figure 12:
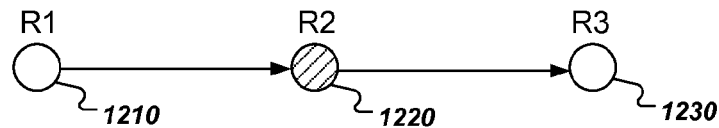
FIG. 12 is a diagram of a revision graph having an unanalyzable snapshot.

FIG. 12 is a diagram of a revision graph having an unanalyzable snapshot. Some snapshots may not be analyzable by a static analysis system. For example, the source code in the snapshot may rely on missing libraries or may lack other dependencies. Thus, the system may attribute violations in snapshots having one or more unanalyzable parents in a different way than violations in other snapshots.

The revision graph in FIG. 12 has three snapshots, a first snapshot R1 1210, a second later snapshot R2 1220, and a third even later snapshot R3 1230.

The snapshot R2, however, is an unanalyzable snapshot. Thus, the system may only be able to compute matching violations between R1 1210 and R3 1230.

Figure 13:
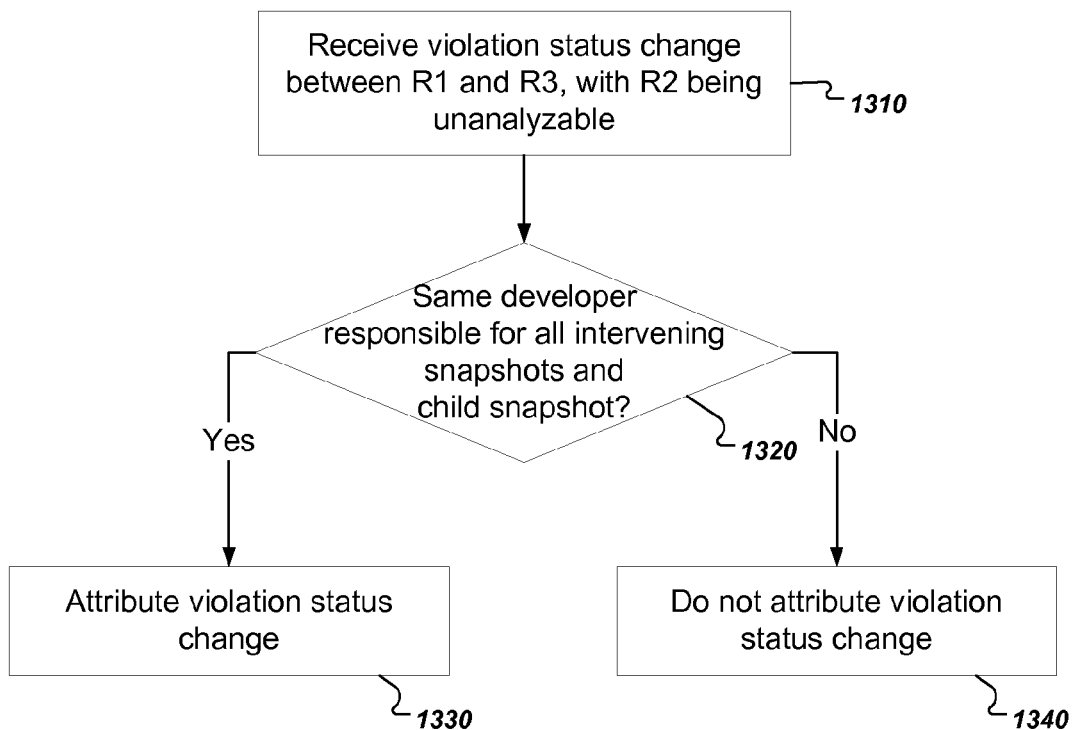
FIG. 13 is a flow chart of an example process for attributing violation status changes for a revision graph having an unanalyzable snapshot.

FIG. 13 is a flow chart of an example process for attributing violation status changes for a revision graph having an unanalyzable snapshot. The process will be described as being performed by an appropriately programmed system of one or more computers, e.g., the attribution engine 130 of FIG. 1.

The system receives a violation status change between a first snapshot R1 and a third snapshot R3 with an intervening unanalyzable snapshot R2 (1310). The system may also receive any number of unanalyzable snapshots between R1 and R3 in the revision graph.

The system determines whether a same developer or group of developers was responsible for all intervening snapshots and the child snapshot (1320). If the same developer was responsible, in that sense, for all intervening snapshots and the child snapshot, the system does attribute the violation status change to the developer (branch to 1330). If not, the system does not attribute the violation status change (branch to 1340).

The system can be implemented to generalize this approach further. In a revision graph having a sequence of snapshots by the same developer, the system can attribute violation status changes to the developer as long as the last snapshot in the sequence is analyzable. The system can attribute violation status changes to this developer, even if one or more snapshots in the sequence are unanalyzable.

Figure 14:
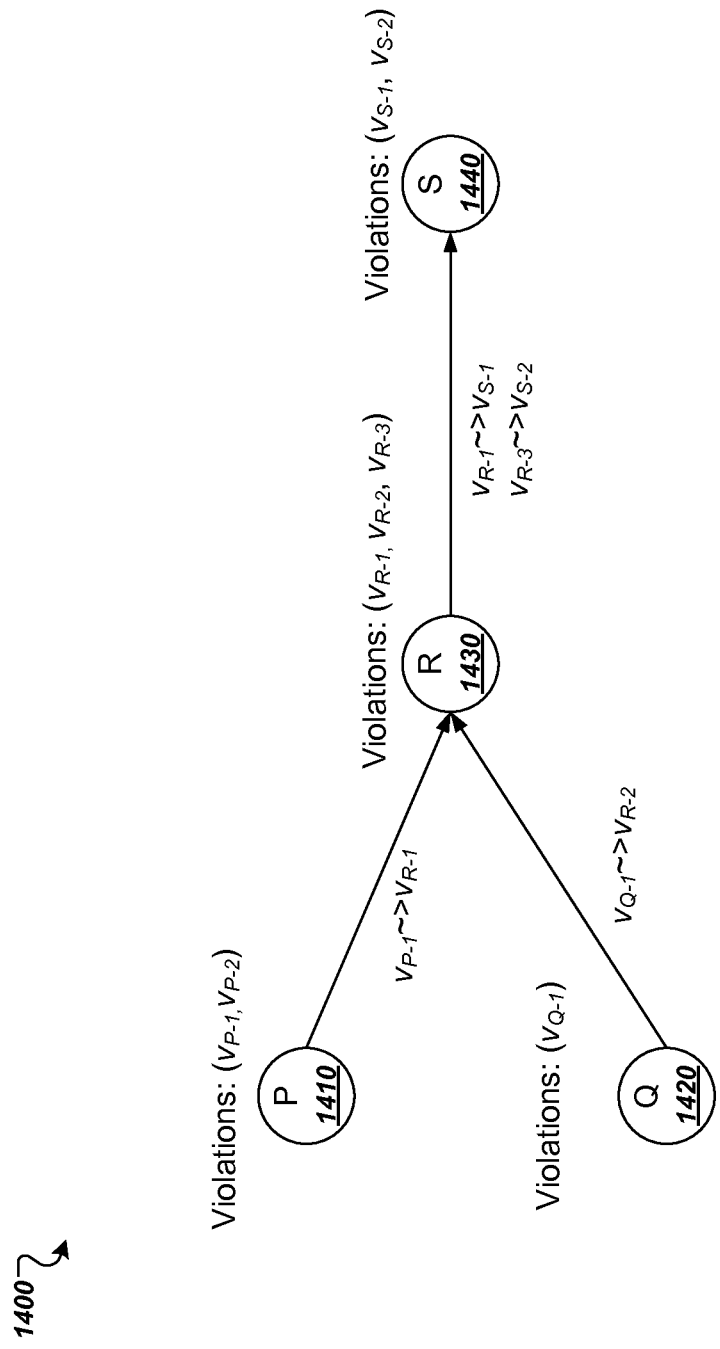
FIG. 14 illustrates transitively matched violations for snapshots represented in a revision graph.

FIG. 14 illustrates transitively matched violations for snapshots represented in a revision graph 1400. The revision graph 1400 includes nodes 1410, 1420, 1430, and 1440, which represent snapshots P, Q, R, and S, respectively. A static analysis system can analyze snapshots in the revision graph 1400 to generate a set of transitively matched violations in snapshots represented by the revision graph 1400.

The example snapshot Q includes violation $v_{Q-1}$, and the snapshot R includes the matching violation $v_{R-2}$. The notation $v_{Q-1} \sim > v_{R-2}$ indicates that violation $v_{Q-1}$ matches violation $v_{R-2}$.

The snapshot S includes violations $v_{S-1}$, and $v_{S-2}$, neither of which matches $v_{R-2}$. Thus, the system can represent the matching violations $v_{Q-1}$ and $v_{R-2}$ as a transitively matched violation ($v_{Q-1}$, $v_{R-2}$, S), which represents the first occurrence of the coding defect in Q, the last occurrence of the coding defect in R, and the first subsequent snapshot, S, in which the coding defect was absent. The violation data elements typically include information about the snapshot in which violations in question occur. Thus, the transitively matched violation data ($v_{Q-1}$, $v_{R-2}$, S) also includes information about the snapshots in which the coding defect first occurred and last occurred.

The system can represent the sequence of matching violations $v_{P-1}$ in P, $v_{R-1}$ in R, and $v_{S-1}$ in S as a single transitively matched violation ($v_{P-1}$, $v_{S-1}$, null). This representation omits any reference to intermediate violation $v_{R-1}$, whose membership as part of the transitively matched violation ($v_{P-1}$, $v_{S-1}$, null) need not be represented explicitly. The "null" value for the third element represents that the coding defect represented by $v_{S-1}$ was never observed to be absent in the code base after being introduced in snapshot P.

Similarly, the system can represent the sequence of matching violations $v_{R-3}$ in R and $v_{S-2}$ in S as the single, transitively matched violation ($v_{R-3}$, $v_{S-2}$, null).

The violation $v_{P-2}$ in P does not match any other violations in the snapshots. The system can represent this single, non-matching violation as ($v_{P-2}$, $v_{P-2}$, R). The fact that both elements of the representation refer to the same violation indicates that the violation does not match any adjacent violations in the code base.

Figure 15:
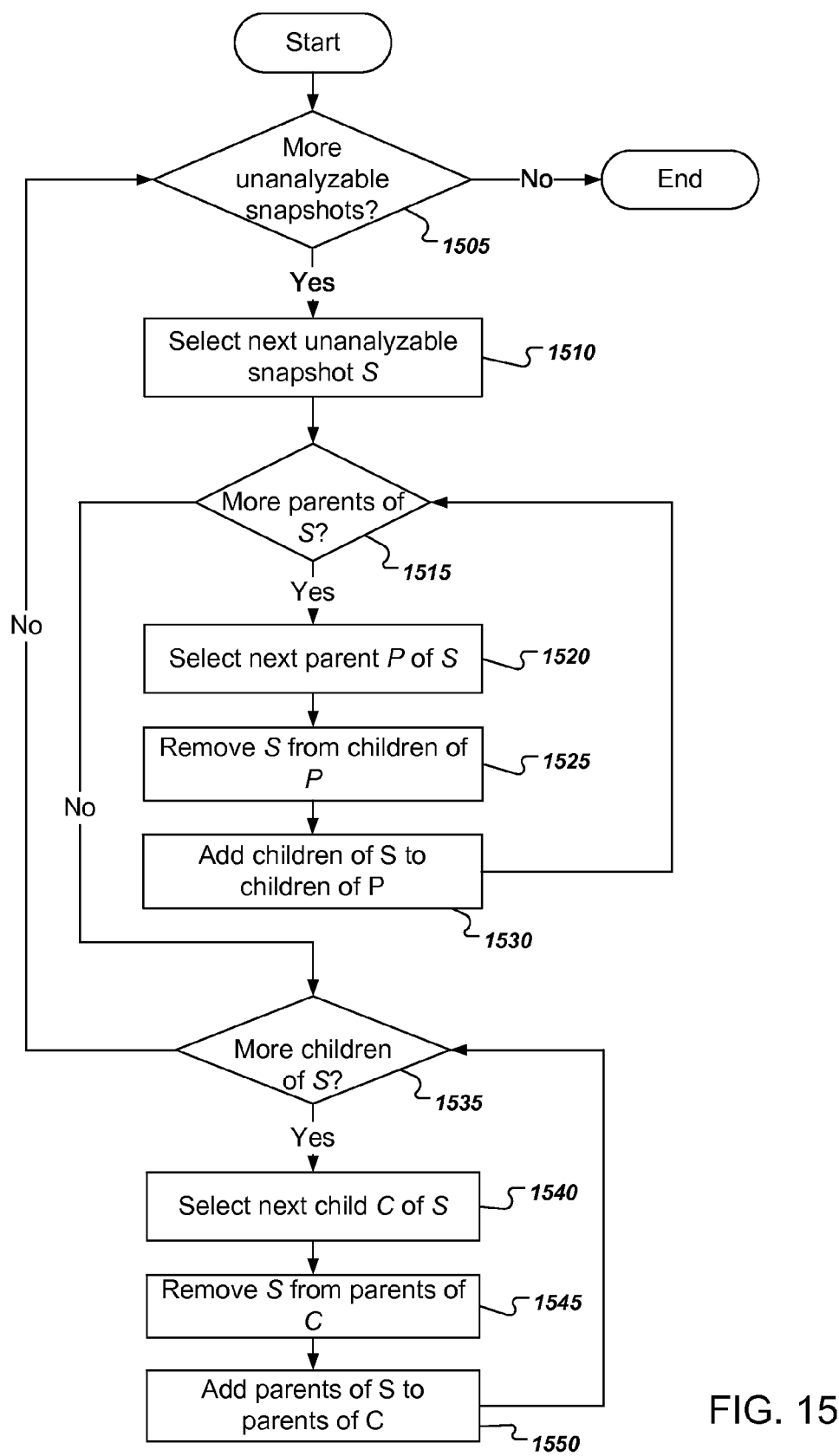
FIG. 15 is a flow chart of an example process for collapsing a revision graph to remove unanalyzable snapshots.

FIG. 15 is a flow chart of an example process for collapsing a revision graph to remove unanalyzable snapshots. In some implementations, a static analysis system can collapse the revision graph to remove unanalyzable snapshots before identifying transitively matched violations, which can result in transitively matched violations that identify longer sequences of matching violations. A static analysis system can perform the example process to remove all unanalyzable snapshots from a revision graph. The system can modify the revision graph or generate a new revision graph to reflect the removal of unanalyzable snapshots. The process can be implemented by one or more computer programs installed on one or more computers. The process will be described as being performed by an appropriately programmed system of one or more computers, e.g., the static analysis system 102 of FIG. 1.

The system determines whether there are more unanalyzable snapshots (1505). In general, an unanalyzable snapshot is one for which analysis has failed. This can happen for example, if errors occurred in building the source code of the snapshot due to compile errors or missing libraries or other dependencies.

If no unanalyzable snapshots remain, the process ends.

If more unanalyzable snapshots remain, the system selects a next unanalyzable snapshot S (branch to 1510).

The system determines whether there are any or any more parents of S (1515). In general, the system will modify the revision graph so that all parents of the unanalyzable snapshot S will become parents of the children of S and so that all children of the unanalyzable snapshot S will become children of the parents of S.

If more parents of S remain, the system selects a next parent P of S (branch to 1520). The system then removes S from the children of P (1525). The system can modify data representing the revision graph to remove the association indicating that S is a child of P.

The system then adds the children of S to the children of P (1530). The system can modify the revision graph data to indicate that each of the children of S is now a child of P. The system then again determines whether there are more parents of S (1515).

If no more parents of S remain, the system determines whether there are any more children of S (branch to 1535). If so, the system selects a next child C of S (branch to 1540). The system then removes S from the parents of C (1545). The system then adds the parents of S to the parents of C (1550). The system can also optionally delete S from the revision graph.

The system then continues to determine whether more children of S remain (1535). If not, the system determines whether more unanalyzable snapshots remain (branch to 1505).

Figure 16A:
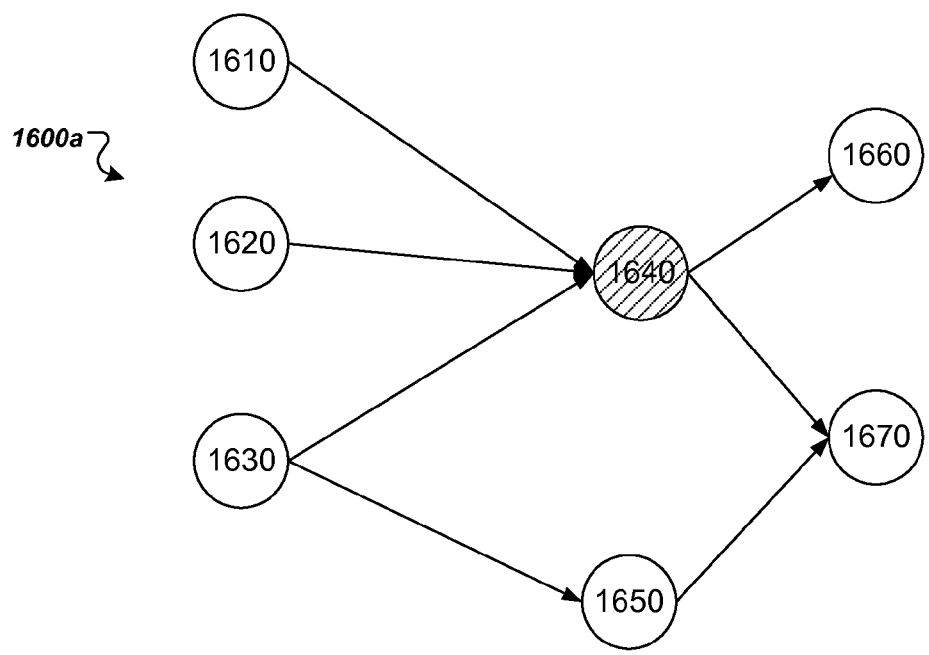
FIG. 16A is a diagram of a revision graph having an unanalyzable snapshot.

FIG. 16A is a diagram of a revision graph 1600a having an unanalyzable snapshot. Node 1640 of the revision graph 1600a represents an unanalyzable snapshot. In FIG. 16A, directed edges represents parent/child relationships. For example, node 1610 has a directed edge to node 1600, representing that node 1610 is a parent snapshot of node 1640.

Each snapshot will generally also be associated with information about all of its parent snapshots. For example, the snapshot represented by the node 1640 will include information that its parent snapshots are represented by nodes 1610, 1620, and 1630.

A static analysis system can remove the unanalyzable snapshot from the revision graph 1600*a* by making all children of node 1640, in this example, nodes 1660 and 1670, children of each of node 1640's parents, in this example, nodes 1610, 1620, and 1630.

Figure 16B:
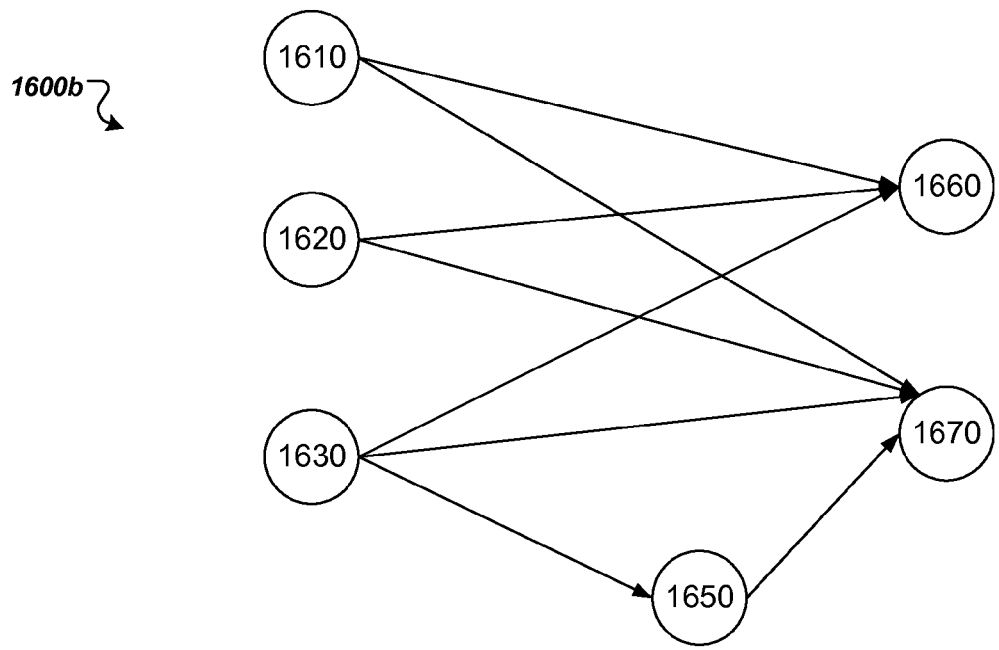
FIG. 16B is a diagram of a modified revision graph after removing an unanalyzable snapshot from the original revision graph.

FIG. 16B is a diagram of a modified revision graph 1600*b* after removing an unanalyzable snapshot from the original revision graph 1600*a*. Node 1640 in the original revision graph 1600*a* has now been removed, resulting in the modified revision graph 1600*b*. All former children of former node 1640 are now children of each of the parents of node 1640, and all parents of former node 1640 are now parents of each of the children of former node 1640.

FIG. 17 is a flow chart of an example process for determining transitively matched violations. The system will generate a single master set M of transitively matched violations in the code base, with each transitively matched violation being represented by the tuple ($v_1$, $v_2$, S), as described above. The process will be described as being performed by an appropriately programmed system of one or more computers, e.g., the static analysis system 102 of FIG. 1.

The system optionally removes unanalyzable snapshots from the revision graph (1700). The system can remove unanalyzable snapshots from the revision graph as described above with reference to FIGS. 15-16B. The system can collapse the original revision graph by removing unanalyzable snapshots to generate a modified revision graph. Having a modified revision graph without unanalyzable snapshots can result in the system generating transitively matched violations that identifying longer sequences of matching violations.

The system determines whether a snapshot of a revision graph remains to be processed (1705).

If so, the system selects a next snapshot S of snapshots in the revision graph (branch to 1710). If the system collapsed the revision graph to remove unanalyzable snapshots, the system will select a next snapshot S of the modified revision graph.

Because the violation matching relationship may not be a symmetric relationship and because the example process identifies transitively matched violations by computing a set of partial transitively matched violations for each snapshot, the system can process snapshots of a revision graph in topological order. That is, any parent snapshots of any particular snapshot will be processed before the particular snapshot, and the particular snapshot will be processed before any children of the particular snapshot.

For example, the system can sort the nodes of the revision graph into topological order. The system can choose from a number of valid topological orderings, which includes a chronological ordering according to the commit date of the corresponding snapshot.

The system obtains partial transitively matched violations (TMVs) for all parent snapshots of S (1715). A partial transitively matched violation for a snapshot P is a violation representing a coding defect that occurs in the snapshot P along with an ancestor violation that represents the first occurrence of the coding defect in an ancestor snapshot of the code base.

However, because the system is still processing snapshots to generate full transitively matched violations, a partial transitively matched violation does not include information about a snapshot in which the coding defect was first observed to be absent. This is because at the time the system is processing S, the coding defects represented by partial transitively matched violations of parents of S may or may not still occur in S. Thus, each violation occurring in parent snapshots of S will generally be represented by one of the partial transitively matched violations.

The system can represent a partial transitively matched violation as a tuple ($v_o$, $v_P$) with $v_o$ being a violation that represents the first occurrence of the coding defect in the code base, in a snapshot O, and $v_P$ being a violation that represents the occurrence of the coding defect in the snapshot P. The first occurrence of the coding defect may have occurred in P or in an ancestor snapshot of P. Each associated ancestor violation transitively matches the violation in P. An partial transitively matched violation may include two instances of the same violation, e.g., when the coding defect first occurred in P.

When processing snapshots in the revision graph in topological order, by the time the the system reaches the snapshot S, the system will already have determined the partial transitively matched violations for all parent snapshots of S.

The system determines whether more violations v have yet to be processed in S (1720). If more violations in S remain to be processed, the system selects a next violation v in S (branch to 1725).

The system then determines whether at least one parent violation $v_P$ occurring in a parent of S matches v (1730). The system can iterate over all partial transitively matched violations of the parent snapshots of S, determining whether the violation occurring in the parent snapshot, as opposed to the ancestor violation, matches v.

The system may have precomputed information about which violations from adjacent snapshots match one another, e.g., as computed by the violation matching engine 130 of FIG. 1. Alternatively, the system can perform a variety of violation matching processes to determine whether any of the open parent violations match v.

If no parent violations $v_P$ match v, the system generates a partial transitively matched violation for S (v, v) (1740). In other words, the system generates a new tuple that includes the partial transitively matched violation v for S and that includes v as its own associated ancestor violation.

If one or more parent violations $v_P$ match v, the system generates partial transitively matched violations for S from each partial TMV having a parent violation that matches v (branch to 1735). The system can generate a new tuple for each parent violation matching v. The new tuple includes v and, as the associated ancestor violation of v, the respective ancestor violation $v_o$ associated with the partial transitively matched violation for the parent of S. By maintaining a set of partial transitively matched violations for each snapshot, the system can quickly and continually update the master set M of full transitively matched violations as new snapshots are added to the revision graph.

The system also adds the parent violations that match v to a set of matched parent violations (1745). The matched parent violations represent coding defects that occurred in a parent of S and that still remained in S.

If no more violations remain to be processed, the system generates a set of unmatched parent violations (branch to 1750). For example, the system can compute a set difference between the open parent violations and matched parent violations. The result of the set difference will be unmatched parent violations. Any unmatched parent violations represent coding defects that were first absent in S. If the snapshot S is attributable, then absent parent violations represent coding defects that were first removed in S. In other words, the unmatched parent violations are violations for which S is the first snapshot in which the respective coding defects were no longer present.

The system generates full transitively matched violations for the unmatched parent violations with S being the first absent snapshot (1755). In other words, for an unmatched parent violation $v_P$, having an associated ancestor violation $v_o$, the system can generate the full transitively matched violation ($v_o$, $v_P$, S) and can add the full transitively matched violation to the master set M.

The system then determines again whether more snapshots remain to be processed (1705).

If no more snapshots remain, the system generates full transitively matched violations for violations occurring in childless snapshots, with a null indicator for the first absent snapshot (1760). In other words, the system can generate full transitively matched violations that represent coding defects that never became absent in the code base. In other words, for a partial transitively matched violation for a snapshot S having no children, the system can add ($v_o$, $v_S$, null) to the master set M, with $v_o$ representing the ancestor violation associated with $v_S$.

After the system has computed the master set M, the system can use the transitively matched violations in the master set M to determine a variety of useful attributes about code in the code base and developers of the code base.

Some attributes may depend on whether or not particular snapshots of the code base are attributable. In general, a snapshot is attributable if it has been successfully analyzed to identify violations occurring in the snapshot and if all of its parent snapshots have also been successfully analyzed. The system will generally use the original revision graph to determine whether snapshots are attributable, rather than a modified revision graph used to identify transitively matched violations.

A snapshot that is not attributable may be designated as unattributable. However, being designated as unattributable is only a status indicator for the snapshot. As described above with reference to FIG. 12, in some situations, a system may still be able to attribute violations for an unattributable snapshot. For example, the snapshot R3 represented by the node 1230 in FIG. 12 is unattributable because the parent node R2 represented by the node 1220 is unanalyzable. Nevertheless, the system can still attribute unmatched violations in R3 when a same developer or group of developers was responsible for the child snapshot and all intervening snapshots.

In general, a transitively matched violation ($v_R$, $v_P$, S) in the master set M indicates that the author of the snapshot R introduced the coding defect represented by violation $v_R$ into the code base, assuming that R is an attributable snapshot. Thus, the system can attribute the introduction of the coding defect into the code base to the author of snapshot R. Similarly, the transitively matched violation ($v_R$, $v_P$, S) also indicates that the author of the snapshot S removed the coding defect from the code base and that the coding defect last occurred in a parent snapshot P of S, assuming that S is attributable. Thus, the system can attribute the removal of the coding defect from the code base to the author of the snapshot S.

If R is an unattributable snapshot, generally the system can only determine that snapshot R was the first time the coding defect $v_R$ was seen in the code base, but not when it was introduced or by whom. Similarly, if S is an unattributable snapshot, the system can generally only determine that the coding defect $v_R$ was first observed to be absent in S, but not when it was removed or by whom.

The system can also use the transitively matched violations to compute a number of useful attributes for coding defects that still occur in the code base. Coding defects that still occur in the code base are indicated by transitively matched violations having a null identifier, e.g., ($v_R$, $v_S$, null). For these violations, the system can determine who introduced the coding defect into the code base. This information can then motivate developers to fix the violations that they introduced. The system can also determine when the existing violation was introduced and in which snapshot. In general, the transitively matched violation ($v_R$, $v_S$, null) indicates that the author of the snapshot R introduced the coding defect into the code base when the snapshot R was committed, assuming R is attributable.

The system can also use the transitively matched violations to compute useful attributes for coding defects that have been fixed. For example, for a transitively matched violation ($v_R$, $v_P$, S), the system can determine which developer fixed which developer's violation.

For an individual developer, the system can obtain all transitively matched violations that represent coding defects fixed by the developer, e.g., transitively matched violations that identify a snapshot that the developer committed as being the first snapshot in which coding were first observed to be absent. The system can then compute how many times other developers that first introduced the coding defects had their coding defects fixed by the particular developer. The system can then rank the other developers by the counts in order to determine which developers most often fix which other developers' violations.

This information can be used to pair developers for training and mentoring. For example, if a first developer often fixes coding defects introduced by a second developer, the system can automatically suggest that the first developer be a mentor to the second developer or that the first developer help train the second developer. In this way, the system can automatically identify gaps in experience and expertise among developers on the team and can help the team improve.

From a transitively matched violation ($v_R$, $v_P$, S), the system can also compute how long a coding defect remained in the code base by comparing the commit times of the snapshot R in which the coding defect was introduced and the snapshot S in which the coding defect was first observed to be absent.

The system can then compute a representative duration for coding defects or particular types of coding defects representing a length of time that the coding defects remained the code base. For example, the system can compute the representative duration by computing a measure of central tendency of individual durations of all coding defects of only particular types of coding defects, e.g., an average, an arithmetic mean, a geometric mean, a median, a mode.

The system can also compute statistics on which types of violations tend to get fixed the fastest, e.g., violations that are easily fixed, and which types of violations tend to get fixed the slowest, e.g., types of violations that tend to remain in the code base for a longer amount of time. Because more serious violations tend to get fixed faster than less serious violations, the system can then prioritize violation types according to their representative durations. In other words, the system can prioritize the violation types according to how fast violations of a particular type tend to get fixed.

For example, a particular type of violation that often causes segmentation faults that halt execution of programs may get fixed faster on average than other types of violations. The system can then prioritize the particular type of violation, e.g., by classifying the violation as a serious violation having a higher priority.

Then, when the system determines that high priority violations exist in the code base, the system can draw special attention to the occurrences of the high priority violations in the code base by automatically notifying developers or system administrators of their existence. This can act as an automatic prompt for the developers to preemptively remove the high priority violations.

Conversely, the system can assign a lower priority to violations that tend to get fixed relatively slowly. The system can thus help developer teams allocate resources by focusing on fixing high-priority violations before low-priority violations.

In addition, by computing how fast particular violations get fixed, the system can also determine a measure of responsiveness for particular developers using the transitively matched violations. For example, the system can compute a measure of central tendency for how long it takes, e.g., average length of time, for each developer to fix his or her own violations. This information can be used for motivation to reward responsive developers and to target training for less responsive developers.

The system can also compute a measure of responsiveness based on coding defects that a developer introduced but did not fix. For example, the system can identify, from the transitively matched violations, coding defects that were introduced by an individual developer but that were not eventually fixed by the developer. The system can also determine violations that were fixed by the developer who introduced them, but that were not fixed quickly enough, e.g., violations that the developer did not fix within a threshold period of time.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
  receiving a plurality of snapshots of a code base, including data representing a revision graph of the snapshots of the code base;
  receiving data representing respective violations occurring in each of the plurality of snapshots; and
  generating a plurality of transitively matched violations in the code base, wherein each transitively matched violation is data that represents a sequence of matching violations occurring in a sequence of respective snapshots of the revision graph of the code base, wherein each transitively matched violation identifies a respective first violation representing a first-observed occurrence of a coding defect in the code base in an first snapshot and a respective second violation representing a last-observed occurrence of the coding defect in a second snapshot, and wherein the transitively matched violation represents that the coding defect occurs in any intervening snapshots in the revision graph between the first snapshot and the second snapshot of the transitively matched violation.

2. The method of claim 1, wherein each transitively matched violation includes an identifier that indicates a snapshot in which the coding defect was first observed to be absent from the code base or a null identifier representing that the coding defect never became absent from the code base.

3. The method of claim 1, further comprising:
  obtaining, for a particular snapshot, a partial transitively matched violation for a parent snapshot of the particular snapshot, wherein the partial transitively matched violation includes a parent violation occurring in the parent snapshot and an associated ancestor violation representing an initial occurrence of a coding defect in an ancestor snapshot of the revision graph;
  determining that the parent violation matches a particular violation of the particular snapshot; and
  generating a second partial transitively matched violation comprising (i) the ancestor violation representing the initial occurrence of the coding defect in the ancestor snapshot of the revision graph and (ii) the particular violation of the particular snapshot.

4. The method of claim 3, further comprising:
determining that the particular violation of the particular snapshot does not match any violations in a child snapshot of the particular snapshot; and
generating a full transitively matched violation that includes the ancestor violation, the particular violation of the particular snapshot, and an identifier of the child snapshot, wherein the identifier of the child snapshot represents a first snapshot in which the coding defect was first observed to be absent from the code base.

5. The method of claim 1, further comprising:
generating a topological ordering of the snapshots in the code base,
wherein generating the plurality of transitively matched violations in the code base comprises generating a set of partial transitively matched violations for each of the snapshots in an order determined by the topological ordering.

6. The method of claim 1, further comprising:
determining that a particular snapshot of the plurality of snapshots is unanalyzable; and
removing the particular snapshot from the revision graph to generate a modified revision graph, including assigning all child snapshots of the particular snapshot to be children of each parent snapshot of the particular snapshot and assigning all parent snapshots of the particular snapshot to be parents of each child snapshot of the particular snapshot.

7. The method of claim 1, further comprising:
identifying an existing violation that occurs in a most recent snapshot of the revision graph, the existing violation representing a coding defect that exists in the most recent snapshot of the code base;
obtaining, from the plurality of transitively matched violations, a first transitively matched violation that includes the existing violation, wherein the first transitively matched violation also identifies an ancestor violation in an ancestor snapshot;
identifying a responsible entity for the ancestor snapshot; and
designating the responsible entity for the ancestor snapshot as an author of the coding defect.

8. The method of claim 1, further comprising:
identifying an existing violation that occurs in a most recent snapshot of the revision graph;
obtaining, from the plurality of transitively matched violations, a first transitively matched violation including an ancestor violation in an ancestor snapshot, the existing violation, and a null identifier representing that a coding defect represented by the first violation was never observed to be absent from the code base; and
computing a length of time that the coding defect existed in the code base, the length of time being based on an elapsed time since the ancestor snapshot was committed.

9. The method of claim 1, further comprising:
obtaining, from the plurality of transitively matched violations, a plurality of first transitively matched violations that represent coding defects fixed by a first developer;
determining how many of the first transitively matched violations represent coding defects introduced by each of a plurality of other developers; and
determining a second developer whose violations are most often fixed by the first developer.

10. The method of claim 9, further comprising:
automatically generating a notification that suggests pairing the first developer and the second developer together.

11. The method of claim 1, further comprising:
computing respective representative durations for each type of transitively matched violation in the plurality of transitively matched violations, including comparing respective commit times of a first snapshot and a second snapshot of each type of transitively matched violation; and
computing a representative duration for each respective type of coding defect, including comparing, for each transitively matched violation of a particular type, a first commit time of an ancestor violation of the transitively matched violation and a second commit time of a first snapshot in which the coding defect became absent from the code base.

12. The method of claim 11, further comprising:
assigning respective levels of priority to each violation type based on the representative durations of each violation type, including assigning higher priorities to violation types having lower representative durations and assigning lower priorities to violation types having higher representative durations.

13. The method of claim 12, further comprising:
determining that one of more high-priority violations occur in most recent snapshot of the code base; and
generating an automatic notification to one or more developers of the code base of the high-priority violations.

14. The method of claim 1, further comprising:
computing respective durations for each transitively matched violation in the plurality of transitively matched violations, including comparing, for each transitively matched violation, a first commit time of an ancestor snapshot of the transitively matched violation and a second commit time of first snapshot in which the coding defect became absent; and
computing a measure of central tendency of the durations of the transitively matched violations of the code base.

15. The method of claim 1, further comprising:
computing, for each of one or more responsible entities, respective durations for each transitively matched violation representing a coding defect introduced by the responsible entity and fixed by the responsible entity; and
computing a measure of responsiveness for each responsible entity based on the respective durations for the coding defects introduced and fixed by each responsible entity.

16. The method of claim 1, further comprising:
obtaining, from the plurality of transitively matched violations, a first plurality of transitively matched violations that represent coding defects introduced by a particular responsible entity including obtaining transitively matched violations that identify a first violation occurring in snapshots committed by the particular responsible entity; and
identifying one or more transitively matched violations that represent coding defects introduced by the particular responsible entity but not fixed by the particular responsible entity including identifying one or more of the plurality of transitively matched violations that identify a snapshot that the particular responsible entity did not commit; and
computing a measure of responsiveness for the particular responsible entity based on the one or more first plurality of transitively matched violations that represent coding defects introduced by the particular responsible entity but not fixed by the particular responsible entity.

17. A system comprising:
one or more computers and one or more storage devices storing instructions that are operable, when executed by the one or more computers, to cause the one or more computers to perform operations comprising:
receiving a plurality of snapshots of a code base, including data representing a revision graph of the snapshots of the code base;
receiving data representing respective violations occurring in each of the plurality of snapshots; and
generating a plurality of transitively matched violations in the code base, wherein each transitively matched violation is data that represents a sequence of matching violations occurring in a sequence of respective snapshots of the revision graph of the code base, wherein each transitively matched violation identifies a respective first violation representing a first-observed occurrence of a coding defect in the code base in an first snapshot and a respective second violation representing a last-observed occurrence of the coding defect in a second snapshot, and wherein the transitively matched violation represents that the coding defect occurs in any intervening snapshots in the revision graph between the first snapshot and the second snapshot of the transitively matched violation.

18. The system of claim 17, wherein each transitively matched violation includes an identifier that indicates a snapshot in which the coding defect was first observed to be absent from the code base or a null identifier representing that the coding defect never became absent from the code base.

19. A computer program product, encoded on one or more non-transitory computer storage media, comprising instructions that when executed by one or more computers cause the one or more computers to perform operations comprising
receiving a plurality of snapshots of a code base, including data representing a revision graph of the snapshots of the code base;
receiving data representing respective violations occurring in each of the plurality of snapshots; and
generating a plurality of transitively matched violations in the code base, wherein each transitively matched violation is data that represents a sequence of matching violations occurring in a sequence of respective snapshots of the revision graph of the code base, wherein each transitively matched violation identifies a respective first violation representing a first-observed occurrence of a coding defect in the code base in an first snapshot and a respective second violation representing a last-observed occurrence of the coding defect in a second snapshot, and wherein the transitively matched violation represents that the coding defect occurs in any intervening snapshots in the revision graph between the first snapshot and the second snapshot of the transitively matched violation.

20. The computer program product of claim 19, wherein each transitively matched violation includes an identifier that indicates a snapshot in which the coding defect was first observed to be absent from the code base or a null identifier representing that the coding defect never became absent from the code base.

21. The system of claim 17, wherein the operations further comprise:
obtaining, for a particular snapshot, a partial transitively matched violation for a parent snapshot of the particular snapshot, wherein the partial transitively matched violation includes a parent violation occurring in the parent snapshot and an associated ancestor violation representing an initial occurrence of a coding defect in an ancestor snapshot of the revision graph;
determining that the parent violation matches a particular violation of the particular snapshot; and
generating a second partial transitively matched violation comprising (i) the ancestor violation representing the initial occurrence of the coding defect in the ancestor snapshot of the revision graph and (ii) the particular violation of the particular snapshot.

22. The system of claim 21, wherein the operations further comprise:
determining that the particular violation of the particular snapshot does not match any violations in a child snapshot of the particular snapshot; and
generating a full transitively matched violation that includes the ancestor violation, the particular violation of the particular snapshot, and an identifier of the child snapshot, wherein the identifier of the child snapshot represents a first snapshot in which the coding defect was first observed to be absent from the code base.

23. The system of claim 17, wherein the operations further comprise:
generating a topological ordering of the snapshots in the code base,
wherein generating the plurality of transitively matched violations in the code base comprises generating a set of partial transitively matched violations for each of the snapshots in an order determined by the topological ordering.

24. The system of claim 17, wherein the operations further comprise:
determining that a particular snapshot of the plurality of snapshots is unanalyzable; and
removing the particular snapshot from the revision graph to generate a modified revision graph, including assigning all child snapshots of the particular snapshot to be children of each parent snapshot of the particular snapshot and assigning all parent snapshots of the particular snapshot to be parents of each child snapshot of the particular snapshot.

25. The system of claim 17, wherein the operations further comprise:
identifying an existing violation that occurs in a most recent snapshot of the revision graph, the existing violation representing a coding defect that exists in the most recent snapshot of the code base;
obtaining, from the plurality of transitively matched violations, a first transitively matched violation that includes the existing violation, wherein the first transitively matched violation also identifies an ancestor violation in an ancestor snapshot;
identifying a responsible entity for the ancestor snapshot; and
designating the responsible entity for the ancestor snapshot as an author of the coding defect.

26. The system of claim 17, wherein the operations further comprise:
identifying an existing violation that occurs in a most recent snapshot of the revision graph;
obtaining, from the plurality of transitively matched violations, a first transitively matched violation including an ancestor violation in an ancestor snapshot, the existing violation, and a null identifier representing that a coding defect represented by the first violation was never observed to be absent from the code base; and computing a length of time that the coding defect existed in the code base, the length of time being based on an elapsed time since the ancestor snapshot was committed.

27. The system of claim 17, wherein the operations further comprise:

obtaining, from the plurality of transitively matched violations, a plurality of first transitively matched violations that represent coding defects fixed by a first developer;

determining how many of the first transitively matched violations represent coding defects introduced by each of a plurality of other developers; and determining a second developer whose violations are most often fixed by the first developer.

28. The system of claim 27, wherein the operations further comprise:

automatically generating a notification that suggests pairing the first developer and the second developer together.

29. The system of claim 17, wherein the operations further comprise:

computing respective representative durations for each type of transitively matched violation in the plurality of transitively matched violations, including comparing respective commit times of a first snapshot and a second snapshot of each type of transitively matched violation; and computing a representative duration for each respective type of coding defect, including comparing, for each transitively matched violation of a particular type, a first commit time of an ancestor violation of the transitively matched violation and a second commit time of a first snapshot in which the coding defect became absent from the code base.

30. The system of claim 29, wherein the operations further comprise:

assigning respective levels of priority to each violation type based on the representative durations of each violation type, including assigning higher priorities to violation types having lower representative durations and assigning lower priorities to violation types having higher representative durations.

31. The system of claim 30, wherein the operations further comprise:

determining that one of more high-priority violations occur in most recent snapshot of the code base; and generating an automatic notification to one or more developers of the code base of the high-priority violations.

32. The system of claim 17, wherein the operations further comprise:

computing respective durations for each transitively matched violation in the plurality of transitively matched violations, including comparing, for each transitively matched violation, a first commit time of an ancestor snapshot of the transitively matched violation and a second commit time of first snapshot in which the coding defect became absent; and computing a measure of central tendency of the durations of the transitively matched violations of the code base.

33. The system of claim 17, wherein the operations further comprise:

computing, for each of one or more responsible entities, respective durations for each transitively matched violation representing a coding defect introduced by the responsible entity and fixed by the responsible entity; and computing a measure of responsiveness for each responsible entity based on the respective durations for the coding defects introduced and fixed by each responsible entity.

34. The system of claim 17, wherein the operations further comprise:

obtaining, from the plurality of transitively matched violations, a first plurality of transitively matched violations that represent coding defects introduced by a particular responsible entity including obtaining transitively matched violations that identify a first violation occurring in snapshots committed by the particular responsible entity; and identifying one or more transitively matched violations that represent coding defects introduced by the particular responsible entity but not fixed by the particular responsible entity including identifying one or more of the plurality of transitively matched violations that identify a snapshot that the particular responsible entity did not commit; and computing a measure of responsiveness for the particular responsible entity based on the one or more first plurality of transitively matched violations that represent coding defects introduced by the particular responsible entity but not fixed by the particular responsible entity.

35. A computer-implemented method comprising:

receiving a plurality of snapshots of a code base, including data representing a revision graph of the snapshots of the code base;

generating a topological ordering of the snapshots in the code base;

receiving data representing respective violations occurring in each of the plurality of snapshots;

generating a plurality of transitively matched violations in the code base, including generating a set of partial transitively matched violations for each of the snapshots in an order determined by the topological ordering, wherein each transitively matched violation is data that represents a sequence of matching violations occurring in a sequence of respective snapshots of the revision graph of the code base, wherein each transitively matched violation identifies a respective first violation representing a first-observed occurrence of a coding defect in the code base in an first snapshot and a respective second violation representing a last-observed occurrence of the coding defect in a second snapshot.

* * * * *